US012448303B2

(12) United States Patent
Rau et al.

(10) Patent No.: US 12,448,303 B2
(45) Date of Patent: Oct. 21, 2025

(54) METHOD FOR SEQUESTRATION OF CARBON DIOXIDE USING A BODY OF WATER AND A SUSPENDED PLATFORM THEREFOR

(71) Applicant: Planetary Hydrogen Inc., Dartmouth (CA)

(72) Inventors: Gregory Hudson Rau, Castro Valley, CA (US); Carl Poirier, Dartmouth (CA); William James Burt, Halifax (CA); Michael John Kelland, Ottawa (CA); Victoria Donnelly, Stittsville (CA)

(73) Assignee: Planetary Technologies Inc., Gatineau (CA)

( * ) Notice: Subject to any disclaimer, the term of this patent is extended or adjusted under 35 U.S.C. 154(b) by 773 days.

(21) Appl. No.: 17/841,474

(22) Filed: Jun. 15, 2022

(65) Prior Publication Data

US 2022/0396503 A1 Dec. 15, 2022

Related U.S. Application Data

(60) Provisional application No. 63/210,793, filed on Jun. 15, 2021.

(51) Int. Cl.
*C02F 1/20* (2023.01)
*B01D 53/62* (2006.01)
(Continued)

(52) U.S. Cl.
CPC ............. *C02F 1/20* (2013.01); *B01D 53/62* (2013.01); *B01D 53/78* (2013.01); *C01F 5/24* (2013.01);
(Continued)

(58) Field of Classification Search
CPC .. C02F 1/20; C02F 2101/10; C02F 2103/007; C02F 2103/08; C02F 2201/008;
(Continued)

(56) References Cited

U.S. PATENT DOCUMENTS

| 4,124,471 A | 11/1978 | Lieb et al. |
| 4,197,421 A | 4/1980 | Steinberg |

(Continued)

FOREIGN PATENT DOCUMENTS

| JP | S61502525 | 11/1986 |
| JP | 2001334271 | 12/2001 |

(Continued)

OTHER PUBLICATIONS

Bobby Gaston & Connor Protter, "Energy-Dispersive X-ray Spectroscopy (EDS)", Chemistry Libre Texts, 2018 and 2019.

*Primary Examiner* — Terry K Cecil
(74) *Attorney, Agent, or Firm* — IP-MEX INC.; Victoria Donnelly

(57) ABSTRACT

A platform for sequestering carbon dioxide using a body of water is described. The platform has a vessel for holding solid metal hydroxide and for exposing the solid metal hydroxide to a flow of water to create a solution of a metal hydroxide having a pH level. The solution containing metal hydroxide is released into the body of water, causing a reaction with the carbon dioxide present in the body of water, thereby producing metal carbonate/bicarbonate, thus sequestering the carbon dioxide. A choice of the metal in the metal hydroxide, a rate of the releasing the solution containing the metal hydroxide into the body of water, and a flow rate of the flow of water so that to substantially maintain the solution containing the metal hydroxide at the (Continued)

pH level that is defined as environmentally safe and not changing chemistry of seawater. A corresponding method is also provided.

22 Claims, 17 Drawing Sheets
(4 of 17 Drawing Sheet(s) Filed in Color)

(51) Int. Cl.
    *B01D 53/78*    (2006.01)
    *C01F 5/24*    (2006.01)
    *C02F 101/10*    (2006.01)
    *C02F 103/00*    (2006.01)
    *C02F 103/08*    (2006.01)

(52) U.S. Cl.
    CPC .. *B01D 2251/402* (2013.01); *B01D 2251/604* (2013.01); *B01D 2252/1035* (2013.01); *B01D 2257/504* (2013.01); *C02F 2101/10* (2013.01); *C02F 2103/007* (2013.01); *C02F 2103/08* (2013.01); *C02F 2201/008* (2013.01); *C02F 2209/40* (2013.01)

(58) Field of Classification Search
    CPC ............ C02F 2209/40; C02F 2103/008; C02F 2209/06; B01D 53/62; B01D 53/78; B01D 2251/402; B01D 2251/604; B01D 2252/1035; B01D 2257/504; C01F 5/24; C01F 11/18; C01P 2002/85; Y02C 20/40
    See application file for complete search history.

(56) References Cited

U.S. PATENT DOCUMENTS

| | | | |
|---|---|---|---|
| 4,387,008 | A | 6/1983 | Winyall et al. |
| 4,707,234 | A | 11/1987 | Mori et al. |
| 5,386,838 | A | 2/1995 | Quincy, III et al. |
| 6,214,313 | B1 | 4/2001 | Berisko et al. |
| 7,604,787 | B2 | 10/2009 | Maroto-Valer et al. |
| 8,834,688 | B2 | 9/2014 | Gilliam et al. |
| 2005/0011770 | A1 | 1/2005 | Katsuyoshi et al. |
| 2005/0126923 | A1 | 6/2005 | Marsden et al. |
| 2006/0185985 | A1 | 8/2006 | Jones |
| 2009/0003240 | A1 | 1/2009 | Negron et al. |
| 2009/0169452 | A1 | 7/2009 | Constantz et al. |
| 2012/0291675 | A1 | 11/2012 | Camire et al. |
| 2020/0024757 | A1 | 1/2020 | Mani |
| 2021/0039044 | A1 | 2/2021 | Alamoudi et al. |

FOREIGN PATENT DOCUMENTS

| | | | | |
|---|---|---|---|---|
| WO | | 2008124538 | 10/2008 | |
| WO | WO-2021137044 | A1 | * 7/2021 | ............. B01D 53/62 |

* cited by examiner

| Element Line | Net Counts | Weight % | Weight % Error | Atom % | Atom % Error | Compound % |
|---|---|---|---|---|---|---|
| C K | 508 | 3.52 | +/- 0.59 | 6.75 | +/- 1.13 | 12.89 |
| O K | 18234 | 24.73S | --- | 35.65 | +/- 0.30 | --- |
| Na K | 48146 | 21.09 | +/- 0.13 | 21.15 | +/- 0.13 | 28.43 |
| Mg K | 35560 | 11.86 | +/- 0.08 | 11.25 | +/- 0.07 | 19.67 |
| Cl K | 90998 | 38.25 | +/- 0.17 | 24.88 | +/- 0.11 | 38.25 |
| Cl L | 1070 | --- | --- | --- | --- | --- |
| Ca K | 872 | 0.54 | +/- 0.03 | 0.31 | +/- 0.02 | 0.76 |
| Ca L | 2701 | --- | --- | --- | --- | --- |
| Total | | 100 | | 100 | | 100 |

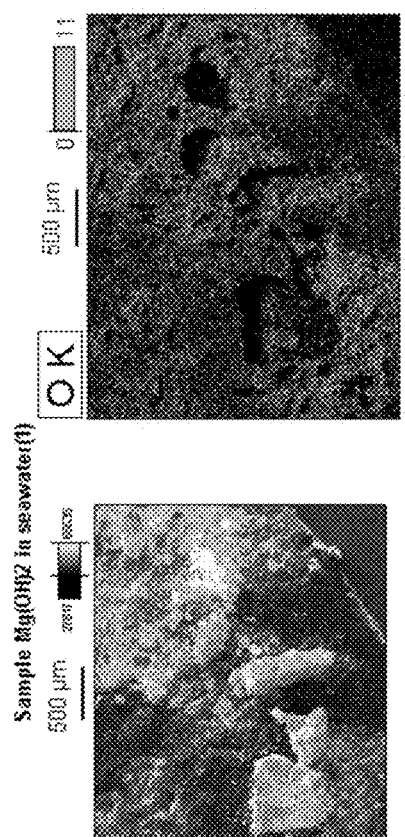
*FIG. 5A*  *FIG. 5B*
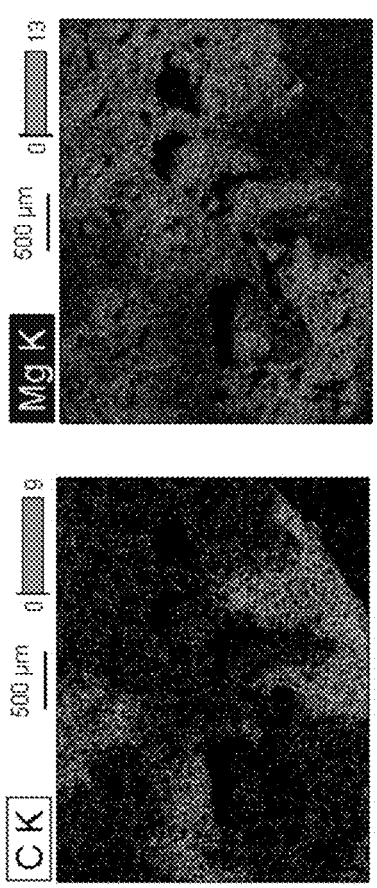
*FIG. 5C*  *FIG. 5D*
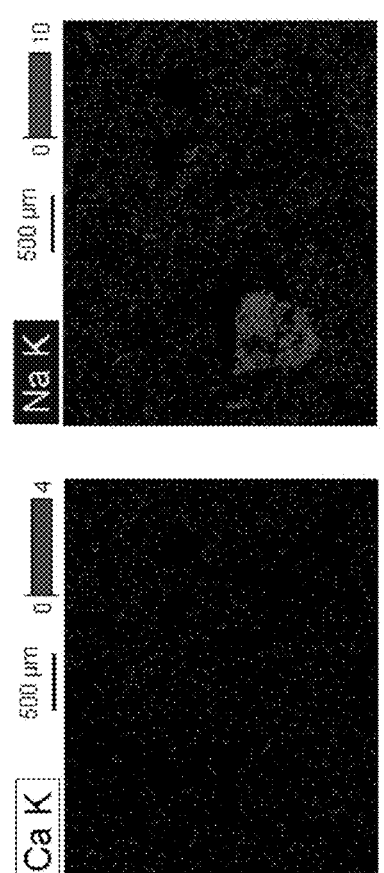
*FIG. 5E*  *FIG. 5F*

METHOD FOR SEQUESTRATION OF CARBON DIOXIDE USING A BODY OF WATER AND A SUSPENDED PLATFORM THEREFOR

CROSS REFERENCE TO RELATED APPLICATIONS

The present application claims benefit from U.S. provisional application Ser. No. 63/210,793 filed on Jun. 15, 2021, the entire contents of which are incorporated herein by reference.

FIELD OF THE INVENTION

The present invention relates to the field of carbon capture and sequestration, and in particular to the method for sequestration of carbon dioxide using a body of water, and a suspended platform therefor.

BACKGROUND OF THE INVENTION

It is of interest to stabilize if not reduce atmospheric $CO_2$ concentrations in order to avoid deleterious climate and ocean chemistry impacts. Methods of achieving this include those that remove $CO_2$ from waste gas streams or from air and that then sequester the carbon from the atmosphere.

The greenhouse gases (GHG) in the atmosphere are capable of absorbing infrared radiation, thus, they trap and keep heat in the atmosphere. By increasing the heat in the atmosphere, greenhouse gases cause the greenhouse effect that results in global warming. Among GHGs, carbon dioxide ($CO_2$) is considered as the primary GHG that is mainly emitted as a result of human activities. According to the report by the United States Environmental Protection Agency, in 2018, 81.3 percent of all U.S. emissions of GHGs was due to $CO_2$ emissions from human activities. Among all human activities that result in $CO_2$ emissions, fossil fuel combustions are one of the main sources of $CO_2$ emission. To overcome this issue research on $CO_2$ reduction (to decrease the amount of GHG in the atmosphere) has gained attention. Various thermo-chemical and electrochemical processes have been developed to reduce point-source $CO_2$ emissions as well as to directly remove $CO_2$ from air.

Among these processes, $CO_2$ capture through the reaction with certain $CO_2$-reactive, alkaline chemicals has been explored with $CO_2$ coming from a variety of concentrated and dilute sources. The addition of alkalinity to surface ocean waters can effect atmospheric $CO_2$ removal and storage through the transformation of seawater-dissolved $CO_2$ into stable compounds has also been explored. Through gas equilibrium processes this removal of $CO_2$ from surface seawater causes the removal of $CO_2$ from the atmosphere, which is equivalent to capturing of $CO_2$ from the atmosphere. There is significant global potential for such approaches to contribute to atmospheric $CO_2$ management, assuming such alkalinity addition to the ocean can be safely and cost-effectively conducted.

Therefore, there is a need for developing improved or alternative methods and systems for carbon capture and sequestration, including sequestration of carbon dioxide using a body of water.

SUMMARY OF THE INVENTION

An objective of the present invention is to provide a method for sequestration of carbon dioxide using a body of water, and a floating or suspended platform therefor.

The invention pertains to methods of introduction of metal hydroxide ions into a solution to increase $CO_2$ uptake and storage by the solution, where the metal hydroxide ions are derived from a solid metal hydroxide. Such solutions may be natural or artificial water bodies that include, but are not limited to ponds, lakes, reservoirs, rivers, and the ocean.

It is of interest to control the release of metal hydroxide ions into a water body so as to stay below concentrations that would cause chemical and biological harm such as unnecessary precipitation of solid carbonate in seawater. It is also of interest to arrange for the release of metal hydroxide ions into the body of water in a cost effective manner.

Embodiment of the present invention describe the following features:

1) Forming a solid metal hydroxide and controlling the rate of its dissolution or release in a body of water by adjusting the amount of water contacted by the solid metal hydroxide, or adjusting the surface area of the solid metal hydroxide exposed to the water.
   Such adjustments include controlling:
   i) the flowrate/turbulence of water over the surface of the metal hydroxide, and
   ii) the surface area of the solid metal hydroxide exposed to a given volume of water.
2) Contacting solid metal hydroxide with an enclosed volume of water to produce dissolved metal hydroxide or small particles of metal hydroxide, and then controlling the release rate of these ions/particles to the body of water, for example ocean. Such controls include:
   i) Metering of the flow/release of the solution containing the ions/particles into the body of water;
   ii) Using membranes or other semi-permeable barriers that separate the enclosed solid metal hydroxide and contacting volume of water from the external body of water, and whose permeability allows metal hydroxide ions and possibly very small metal hydroxide particles to pass at a given rate. By selecting a membrane/barrier and/or by adjusting the surface area of the membrane/barrier relative to the volume of water into which the ions/particles are to be released, the impact to water chemistry and biology can be controlled; and According to one aspect of the invention, there is provided a floating platform for sequestering carbon dioxide using a body of water, comprising:

(a) a vessel for holding solid metal hydroxide;
(b) means for exposing the solid metal hydroxide to a flow of water to create a solution of a metal hydroxide having a pH level;
(b) means for releasing the solution containing the metal hydroxide into the body of water, including causing a reaction of the released metal hydroxide with the carbon dioxide present in the body of water, thereby producing one or more of a metal carbonate and metal bicarbonate below a saturation concentration in the body of water, thus sequestering the carbon dioxide using a body of water; and
(c) means for choosing a rate of the releasing the solution containing the metal hydroxide into the body of water, and a flow rate of the flow of water so that to substantially maintain the solution containing the metal hydroxide at the pH level that is defined as environmentally safe for the body of water.

In the floating platform described above, the metal hydroxide is magnesium hydroxide, The rate of the releasing the solution is chosen of about 3 mmoles dissolved $Mg(OH)_2/(L \times m^2 \times day)$.

In the embodiments of the invention, the desired maximum pH level is 9.0 and less desirably from about 9.0 to about 9.4, and preferably not exceeding 9.4.

According to another aspect of the invention, there is provided a method for sequestering carbon dioxide using a body of water, comprising:
 (a) in a vessel containing solid metal hydroxide, exposing the solid metal hydroxide to a flow of water to create a solution containing the metal hydroxide and having a pH level;
 (b) releasing the solution containing the metal hydroxide into the body of water, including causing a reaction of the released metal hydroxide with the carbon dioxide present in the body of water, thereby producing one or more of a metal carbonate and metal bicarbonate at below saturation concentration in the body of water, thus sequestering the carbon dioxide using a body of water;
 (c) choosing a rate of the releasing the solution containing the metal hydroxide into the body of water in the step (b) and a flow rate of the flow of water in the step (a) so that to substantially maintain the solution containing the metal hydroxide at the pH level that is defined as environmentally safe for the body of water.

In the method described above, the metal hydroxide is magnesium hydroxide. The step (c) comprises choosing the rate of the releasing equal to about 3 mmoles dissolved $Mg(OH)_2/(L \times m^2 \times day)$.

In the method described above, the pH level is from about 9.0 to about 9.4. In the embodiments of the present invention, the pH level is not exceeding 9.4.

Thus, an improved method for sequestration of carbon dioxide using a body of water and a corresponding platform have been provided.

BRIEF DESCRIPTION OF DRAWINGS

The patent or application file contains at least one drawing executed in color. Copies of this patent application publication with color drawing(s) will be provided by the Office upon request and payment of the necessary fee.

Embodiments of the present invention will be further described with reference to the accompanying exemplary drawings, in which:

FIG. 5A shows EDS mapping of dissolved $Mg(OH)_2$ sample in seawater;

FIG. 5B shows EDS mapping of dissolved O in seawater;
FIG. 5C shows EDS mapping of dissolved C in seawater;
FIG. 5D shows EDS mapping of dissolved Mg in seawater;
FIG. 5E shows EDS mapping of dissolved Ca in seawater;
FIG. 5F shows EDS mapping of dissolved Na in seawater.

DESCRIPTION OF EMBODIMENTS OF THE INVENTION

In our experiments, we have taken into account a relatively low solubility of magnesium hydroxide in water (approximately 0.01 g/L, and a solubility product of about $3 \times 10^{-11}$), and observed that an otherwise pure water solution saturated with magnesium hydroxide can only attain a maximum localized pH of about 10.3.

Figure 1:
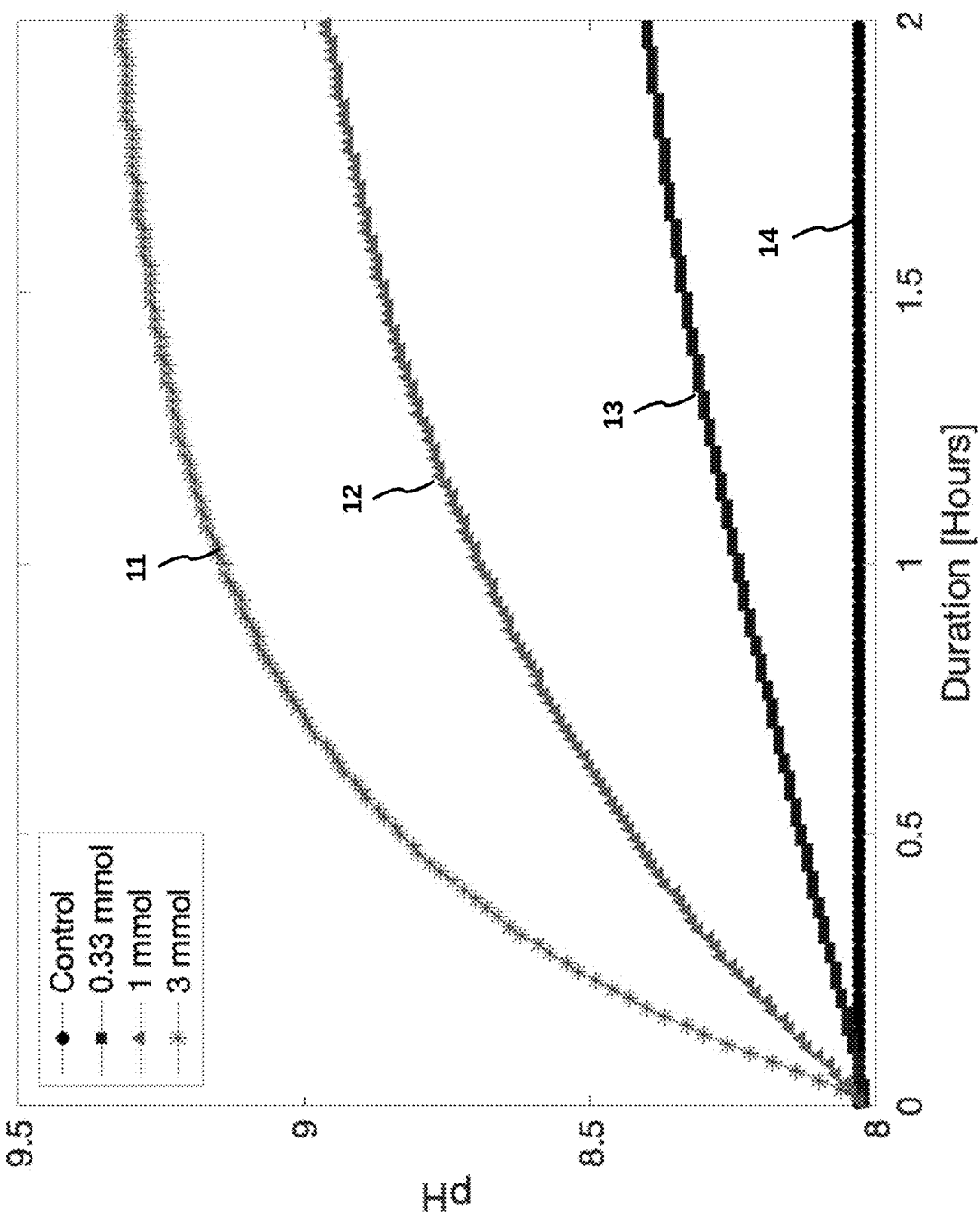
FIG. 1 illustrates an initial increase of seawater pH values versus time upon adding different additions of magnesium hydroxide to 1 L of seawater.

Additionally, our experimentation has shown that, when 3 mmoles/L magnesium hydroxide power was added at seawater, the maximum localized pH achieved in the seawater reaches about 9.3 after about 2 hr, with maximum pH values correspondingly declining with lower additions of $Mg(OH)_2$, as illustrated in FIG. 1.

In more detail, a diagram 10 of FIG. 1 illustrates an increase of localized pH values over time measured in hours, upon adding increasing amounts of magnesium hydroxide powder to seawater, namely:
 plot 11 corresponds to an addition of 3 mmol/L $Mg(OH)_2$ powder;
 plot 12 corresponds to an addition of 1 mmol/L $Mg(OH)_2$ powder;

plot 13 corresponds to an addition of 0.33 mmol/L Mg(OH)$_2$ powder; and plot 14 corresponds to control measurements, with no Mg(OH)$_2$ being added to the seawater.

This rise in pH reflects the dissolution of the particulate Mg(OH)$_2$ forming dissolved Mg(OH)$_2$ that elevates solution alkalinity.

Once the localized pH value reaches its maximum, the localized pH values decline over a typical period of several days, reaching corresponding lower pH plateau values afterwards.

FIG. 2A illustrates a decline of localized pH values over time, for different initial additions of magnesium hydroxide powder being added to the seawater, namely:

plot 21a corresponding to an addition of 3 mmol/L Mg(OH)$_2$ powder;

plot 22a corresponding to an addition of 1 mmol/L Mg(OH)$_2$ powder;

plot 23a corresponding to an addition of 0.33 mmol/L Mg(OH)$_2$ powder; and plot 24a corresponds to control measurements, with no Mg(OH)$_2$ being added to seawater.

FIG. 2B illustrates a dependence of dissolved inorganic carbon (DIC) versus time measured in days, for different concentrations of magnesium hydroxide being added to the seawater, namely:

plot 21b corresponding to an addition of 3 mmol/L Mg(OH)$_2$ powder;

plot 22b corresponding to an addition of 1 mmol/L Mg(OH)$_2$ powder;

plot 23b corresponding to an addition of 0.33 mmol/L Mg(OH)$_2$ powder; and plot 24b corresponding to control measurements, with no Mg(OH)$_2$ being added to seawater.

FIG. 2C illustrates a dependence of Alkalinity (AT) versus time measured in days, for different concentrations of magnesium hydroxide being added to the seawater, namely:

plot 21c corresponding to an addition of 3 mmol/L Mg(OH)$_2$ powder;

plot 22c corresponding to an addition of 1 mmol/L Mg(OH)$_2$ powder;

plot 23c corresponding to an addition of 0.33 mmol/L Mg(OH)$_2$ powder; and plot 24c corresponds to control measurements, with no Mg(OH)$_2$ being added to the seawater.

This dissolved Mg(OH)$_2$ in turn consumes dissolved CO$_2$ and converts it to bicarbonate and carbonate ions as follows:

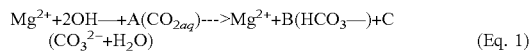

$$Mg^{2+}+2OH^-+A(CO_{2aq}) \text{---}> Mg^{2+}+B(HCO_3^-)+C(CO_3^{2-}+H_2O) \quad \text{(Eq. 1)}$$

where B and C are the molecular fractions of dissolved magnesium bicarbonate and magnesium carbonate, respectively, where A=B+C. The partitioning of the carbon into bicarbonate and carbonate ion is dictated by the solution pH, with the fraction (C) in carbonate ion increasing with pH above neutral, while the bicarbonate fraction (B) decreases. For example, at a seawater pH of 8, A, B and C are approximately 1.85, 1.68 and 0.17 respectively, whereas at pH of 9, A, B and C are about 1.35, 0.70 and 0.65, respectively.

Figure 2:
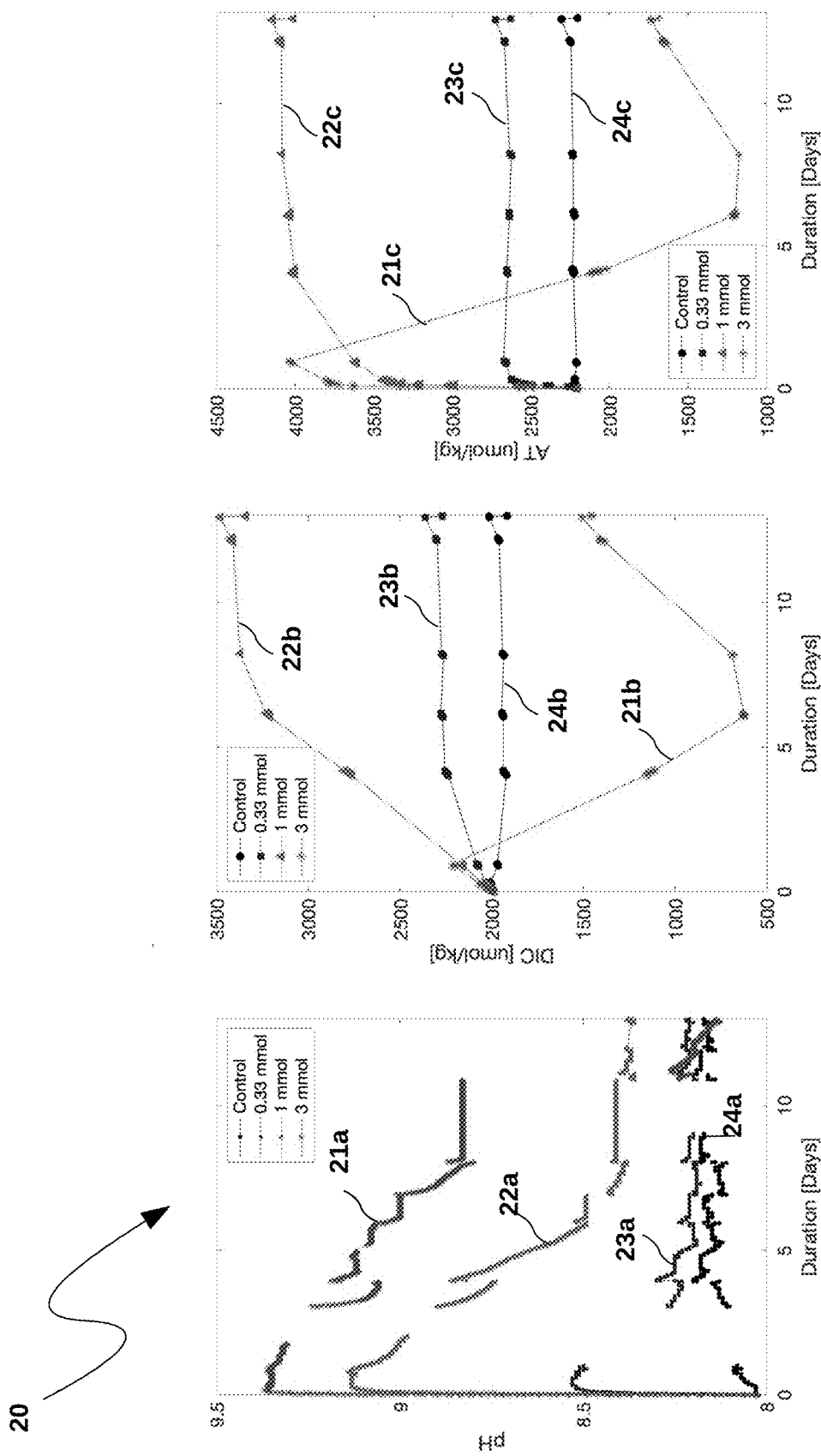
FIG. 2A illustrates change of seawater pH values over many days after addition of various amount of magnesium hydroxide powder to 1 L of seawater.
FIG. 2B illustrates the change in dissolved inorganic carbon (DIC) over many days after addition of various amounts of magnesium hydroxide powder added to 1 L of seawater.
FIG. 2C illustrates the change of alkalinity (AT) over many days after addition of various amount of magnesium hydroxide powder to 1 L of seawater.

In the context of maximizing net CO$_2$ reaction and removal, maximizing A (minimizing C) is desirable. This means that for maximizing CO$_2$ removal and storage, it is advantageous to minimize the pH above ambient seawater and/or to minimize duration of pH elevation, for example rapidly return seawater pH to near ambient values (near pH of about 8.1). This decline in pH can be achieved by the dissolution of atmospheric CO$_2$ into seawater caused the air-solution CO$_2$ disequilibrium as a result of the solution's CO$_2$-absorbing reaction shown in Equation 1. This explains the decline in pH from maximum values as seen in FIG. 2. When Mg(OH)$_2$ is locally added to the ocean, the initially elevated pH can also decline to near ambient values (for example, 8.1) through dilution of the dissolved Mg(OH)$_2$ generated with a vastly larger quantity of ambient seawater.

It is also advantageous to lower seawater pH from elevated values since seawater CO$_3^{2-}$ concentration, and hence degree of saturation of CaCO$_3$, naturally present in seawater, increases with increasing pH. This can lead to undesirable precipitation of CaCO$_3$ from seawater via this reaction:

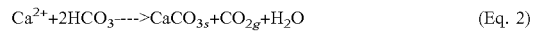

$$Ca^{2+}+2HCO_3^- \text{---}> CaCO_{3s}+CO_{2g}+H_2O \quad \text{(Eq. 2)}$$

Spontaneous precipitation of CaCO$_3$ and degassing of CO$_2$ from seawater can happen at a seawater pH of near 9 and above, in which case the natural carbon concentration and retention in seawater and seawater alkalinity are undesirably lowered.

Figure 3:
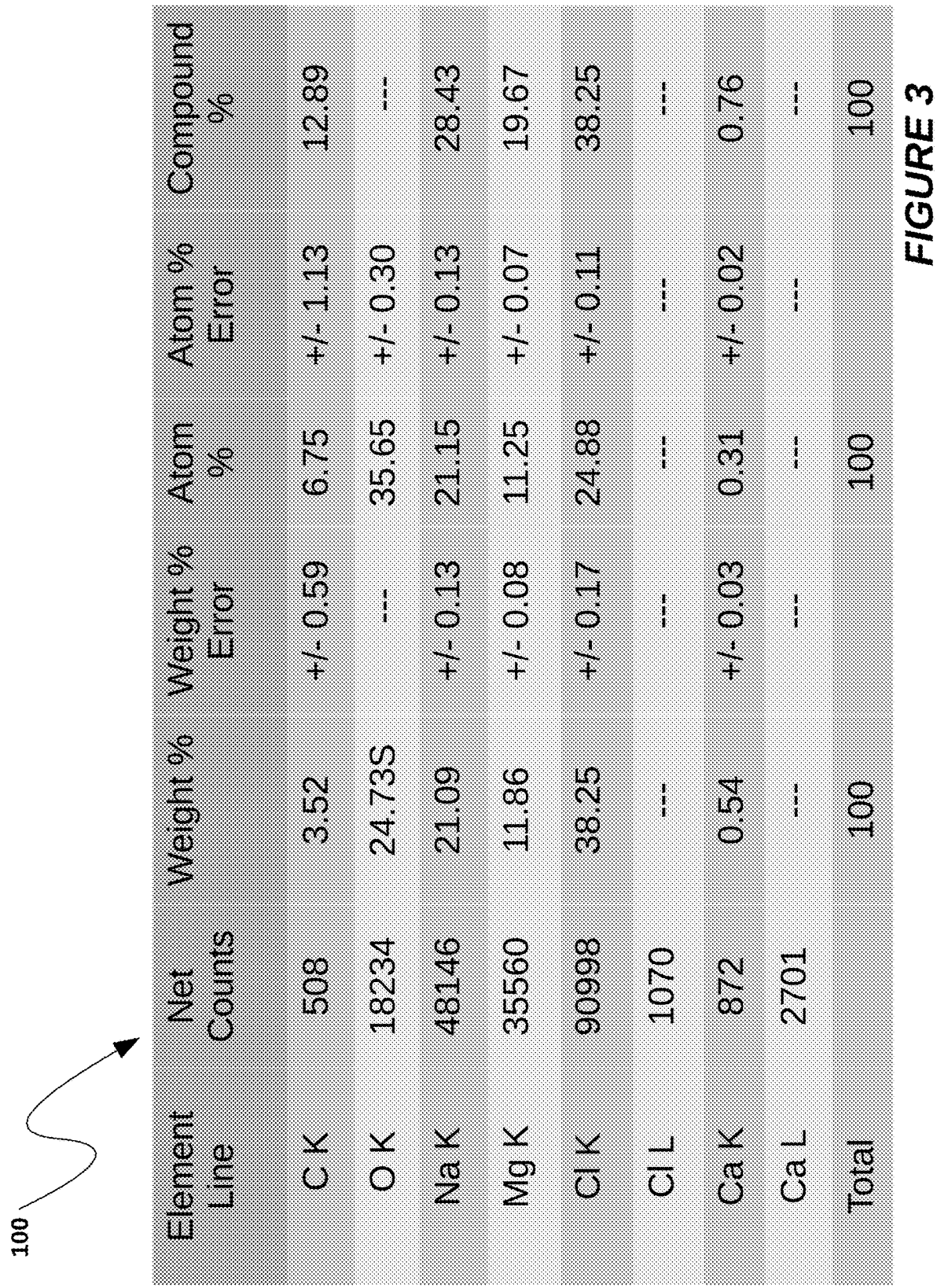
FIG. 3 shows a table summarizing results of elemental analysis of a sample of dissolved excess $Mg(OH)_2$ in seawater.
Figure 4:
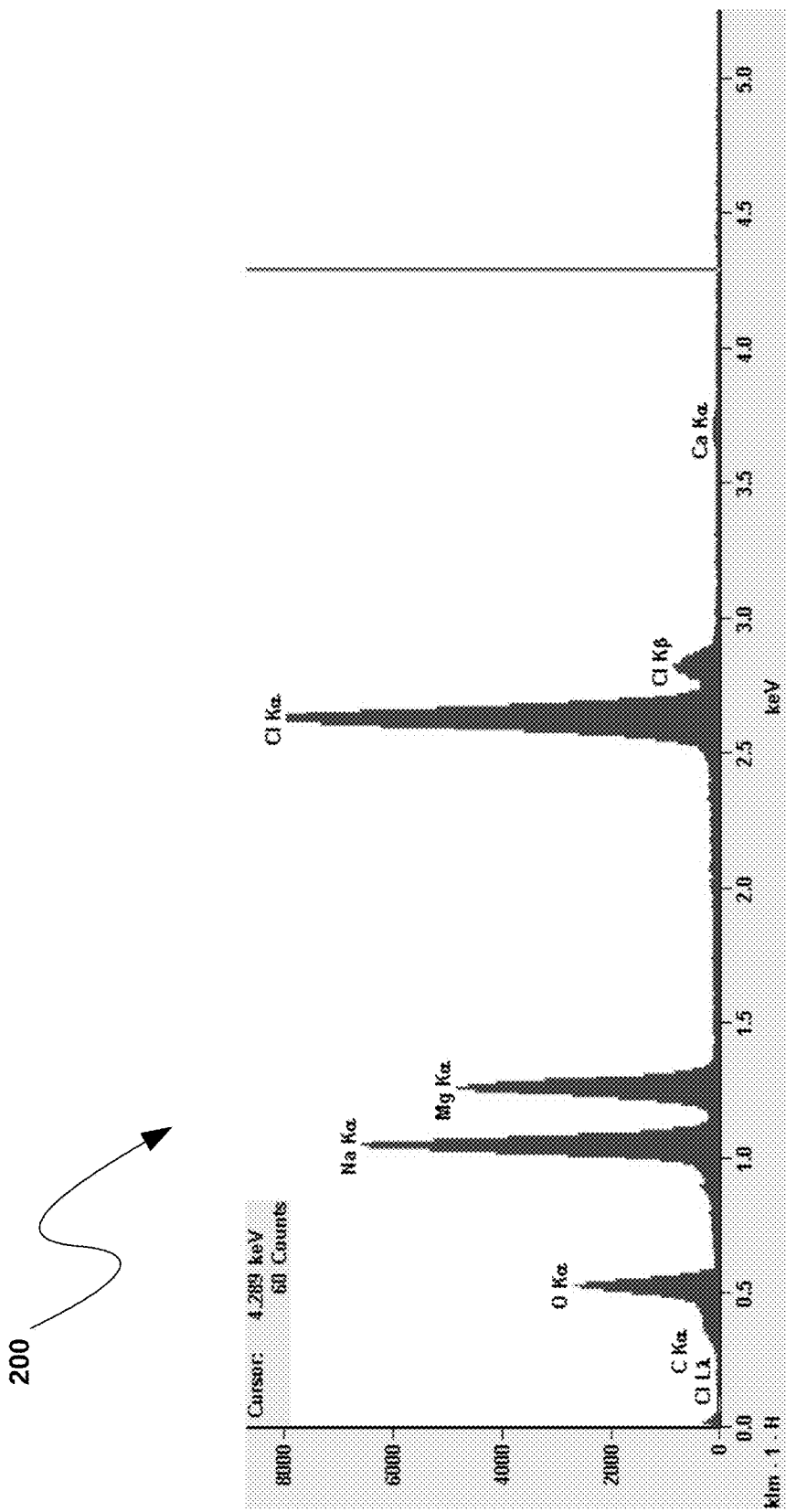
FIG. 4 shows Energy-Dispersive X-ray Spectroscopy (EDS) analysis of dissolved $Mg(OH)_2$ in seawater.

In this context, production of solid CaCO$_3$ was observed in our preliminary lab experiments, results of which are illustrated in FIGS. 3-5.

Namely:

FIG. 3 shows a table 100 summarizing results of elemental analysis of a sample of dissolved excess Mg(OH)$_2$ in seawater;

FIG. 4 shows Energy-Dispersive X-ray Spectroscopy (EDS) analysis 200 of dissolved Mg(OH)$_2$ in seawater;

FIG. 5A shows EDS element mapping of dissolved Mg(OH)$_2$ sample in seawater;

FIG. 5B shows EDS element mapping of dissolved O in seawater;

FIG. 5C shows EDS element mapping of dissolved C in seawater;

FIG. 5D shows EDS element mapping of dissolved Mg in seawater;

FIG. 5E shows EDS element mapping of dissolved Ca in seawater;

FIG. 5F shows EDS element mapping of dissolved Na in seawater.

The above noted effect of precipitation of CaCO$_3$ is seen in the 3 mmol/L experiment (FIG. 2) wherein the initially high pH level exceeds the preceding precipitation threshold, causing CaCO$_3$ precipitation and generation of CO$_2$ (via Equation 1) and thus lowering solution alkalinity (AT) and DIC.

The desired level of pH can thus be achieved by controlling the production, release and/or dilution rate of the dissolved metal hydroxide as well as by the degree of ingassing of CO$_2$ from the atmosphere.

In the treatments with less than 3 mmol/L Mg(OH)$_2$ added, the deficit in dissolved CO$_2$ (relative to air concentrations) so created by the reaction in Equation 1 then forces air CO$_2$ to invade the solution, depressing pH (as shown in FIG. 2A, plots 22a and 23a) and elevating the total dissolved inorganic carbon (DIC) in solution (as shown in FIG. 2B, plots 22b and 23b). Such DIC increases provide is a direct measure of the desired removal of CO$_2$ from air into the ocean, and its stable storage and sequestration in seawater.

As can be seen in the long-term monitoring of the 3 mmoles/L treatment (FIGS. 2B and 2C), the total dissolved inorganic carbon (DIC) and the alkalinity (AT) both abruptly decline after day 1 of the treatment. This indicates the undesirable outcome where seawater pH has become elevated to the point that CaCO$_3$, naturally present in seawater, becomes so saturated that it spontaneously precipitates, thus undesirably removing both DIC and AT from seawater. It is therefore clear that the concentration of dissolved $Mg(OH)_2$ released to the ocean needs to be controlled so as to avoid undesirable precipitation of the $CaCO_3$ naturally present in seawater, to maximize (per mol of $Mg(OH)_2$ added) the transfer of $CO_2$ from air into storage as DIC in seawater and to also avoid elevations in pH that would exceed legal pH discharge requirements, for example pH of about 9.0.

These observations indicate that we need to control the release rate of $Mg(OH)_2$ such that seawater AT concentrations do not exceed about 4 mmoles/L, which means that if ambient seawater has an ambient AT of 2.2 moles/L (FIG. 2C), a limit of about 1.8 mmoles/L of additional alkalinity or about 0.9 mmoles/L of dissolved $Mg(OH)_2$/L can be added to ambient seawater over the course of about 1 day.

This implies that we need to control the dissolution rate of the solid $Mg(OH)_2$ and addition of dissolved $Mg(OH)_2$ so as not to exceed about 0.9 mmoles/(L×day). With surface area/mass of the original powdered $Mg(OH)_2$ of about 5 $m^2$/gram, or about 0.3 $m^2$/mmole, the implied maximum dissolved $Mg(OH)_2$ release rate becomes about 3 mmoles of $Mg(OH)_2/(L \times m^2 \times day)$ or an AT production rate of about 6 mmoles $AT/(L \times m^2 \times day)$.

It therefore follows that any combination of i) volume of seawater contacting and diluting the $Mg(OH)_2$, ii) surface area of solid $Mg(OH)_2$ contacted by the preceding volume and iii) the duration of the contact that yields a value at or below the preceding value of the release rate of about 3 mmoles dissolved $Mg(OH)_2/(L \times m^2 \times day)$ will satisfy the requirement of staying within desired seawater chemical limits. Dissolution rates below the preceding may be used to further reduce the maximum pH attained, but this will also reduce the quantity of $CO_2$ removal and storage achieved considering the proportionality of $Mg(OH)_2$ addition to $CO_2$ removal (Equation 2). For example, a dissolved $Mg(OH)_2$ release rate of 1.5 mmoles/$(L \times m^2 \times day)$ would reduce in half the amount of $CO_2$ removed and stored per unit time relative to the preceding example.

The invention therefore uses the preceding calculation to design distribution systems for release of dissolved metal hydroxide from solid forms into seawater.

As mentioned above, embodiments of the present invention provide a method and system for dissolving metal hydroxide into seawater so as to maintain seawater pH within safe environmental limits while maximizing $CO_2$-removal and sequestration and avoiding prolonged and/or undesirable changes to seawater chemistry, including avoiding precipitation of $CaCO_3$ naturally present in seawater.

The embodiments of the invention use the above noted observations and experiments by manufacturing floating or suspended distribution systems for the addition of the magnesium hydroxide to seawater.

Figure 6A:
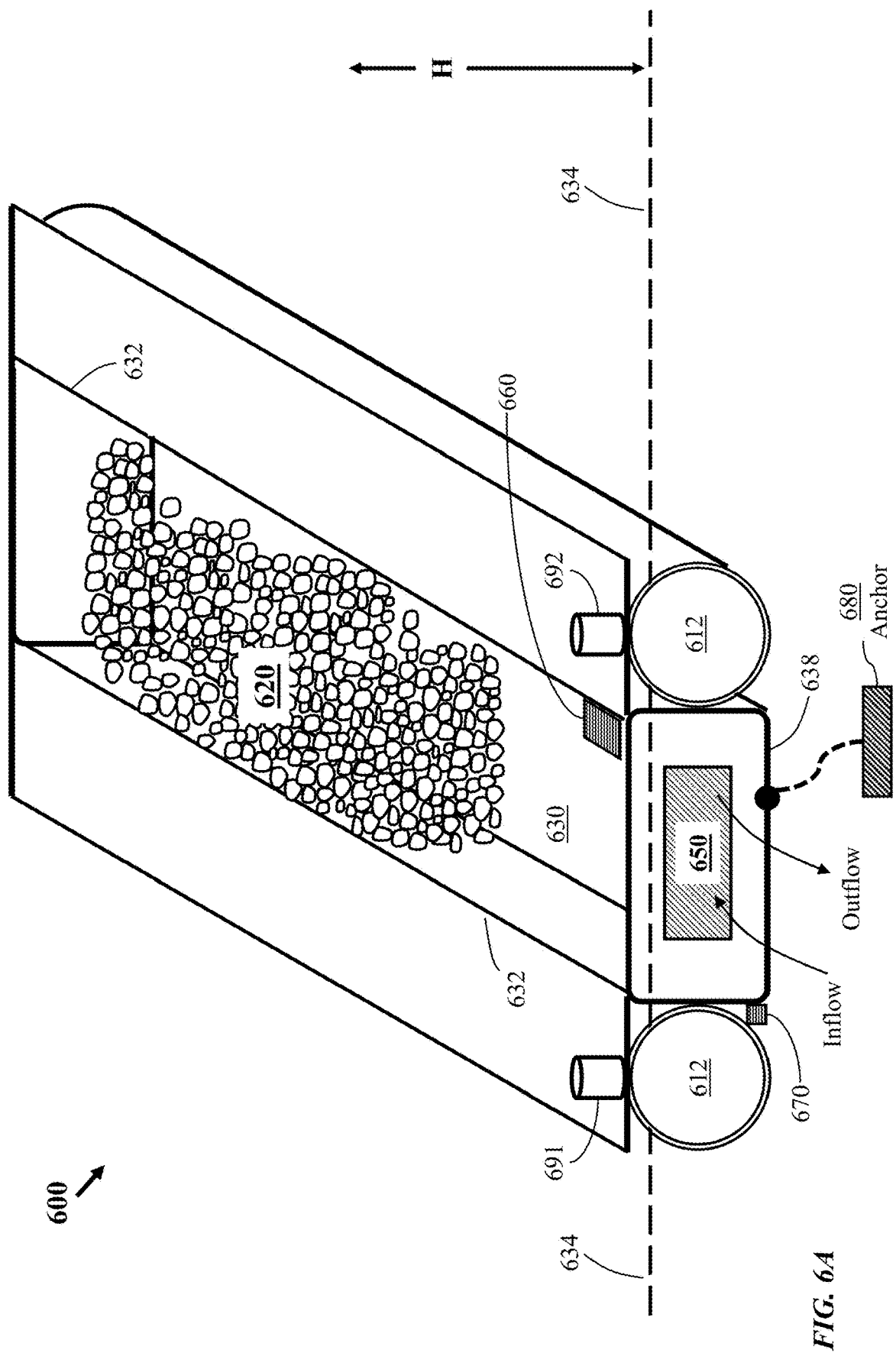
FIG. 6A schematically illustrates a prospective view of a passive floating platform of an embodiment of the invention.

One embodiment of the invention describes a passive floating platform/vessel 600 schematically illustrated in FIG. 6A, which is made buoyant, for example through the use of a floating platform 600 supported by buoyant sections 612 around the perimeter (for simplicity, only two buoyant sections 612 on two sides of the platform 600 are shown in FIG. 6A). The $Mg(OH)_2$ 620 is loaded into a sunken opening or hull 630 of the floating platform 600 as a solid mass 620 or as a collection of solid $Mg(OH)_2$ masses such as pellets, bricks, or disks, or chunks of natural $Mg(OH)_2$ (brucite mineral) as extracted from a brucite mine.

The buoyant sections 612, the size of the opening 630, and the mass of $Mg(OH)_2$ to be loaded in the opening 630 are chosen so that an upper surface 632 of the sunken opening 630 is above the sea level 634 or at least floating at the sea level 634 when the opening 630 is loaded with solid magnesium hydroxide or forms thereof, and any seawater contacting the surfaces of the solid magnesium hydroxide, but lower than an average height (H) of natural ocean waves in the part of the ocean where the floating platform 600 is placed. Further the hull 630 may have a side opening 650 and/or a bottom opening 661 for allowing the seawater to enter the hull 630 and the alkaline water to exit the hull 630, as will be described in more detail below with regard to FIGS. 6A and 6B.

Figure 6B:
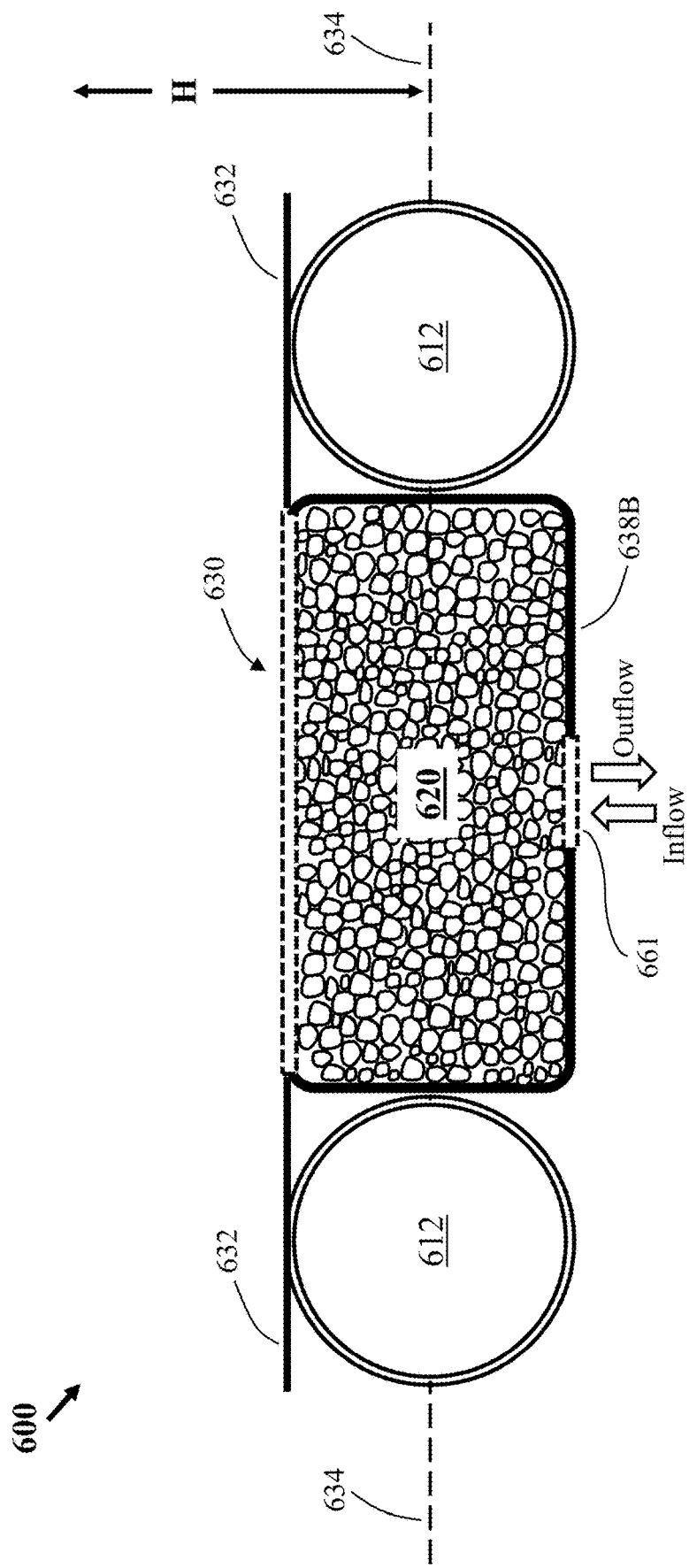
FIG. 6B illustrates a side cross section view of a fully loaded passive floating platform of FIG. 6A floating above sea level.

FIG. 6B shows a side cross section view of the floating platform 600 with the opening 630 loaded with solid magnesium hydroxide and any seawater into which the solid or solids are submerged, when the platform 600 floats with the upper surface 632 above the sea level 634, and the bottom surface 638b of the opening 630 being at the bottom 638b level. The bottom surface 638b may have a bottom hole or bottom opening 661, for discharging the alkaline water out of the hull 630 and also allowing the seawater to enter the hull 630 from the bottom via natural ocean waves, the bottom opening 661 optionally may have a permeable membrane similar to that described below with regard to the side opening 650.

Figure 6C:
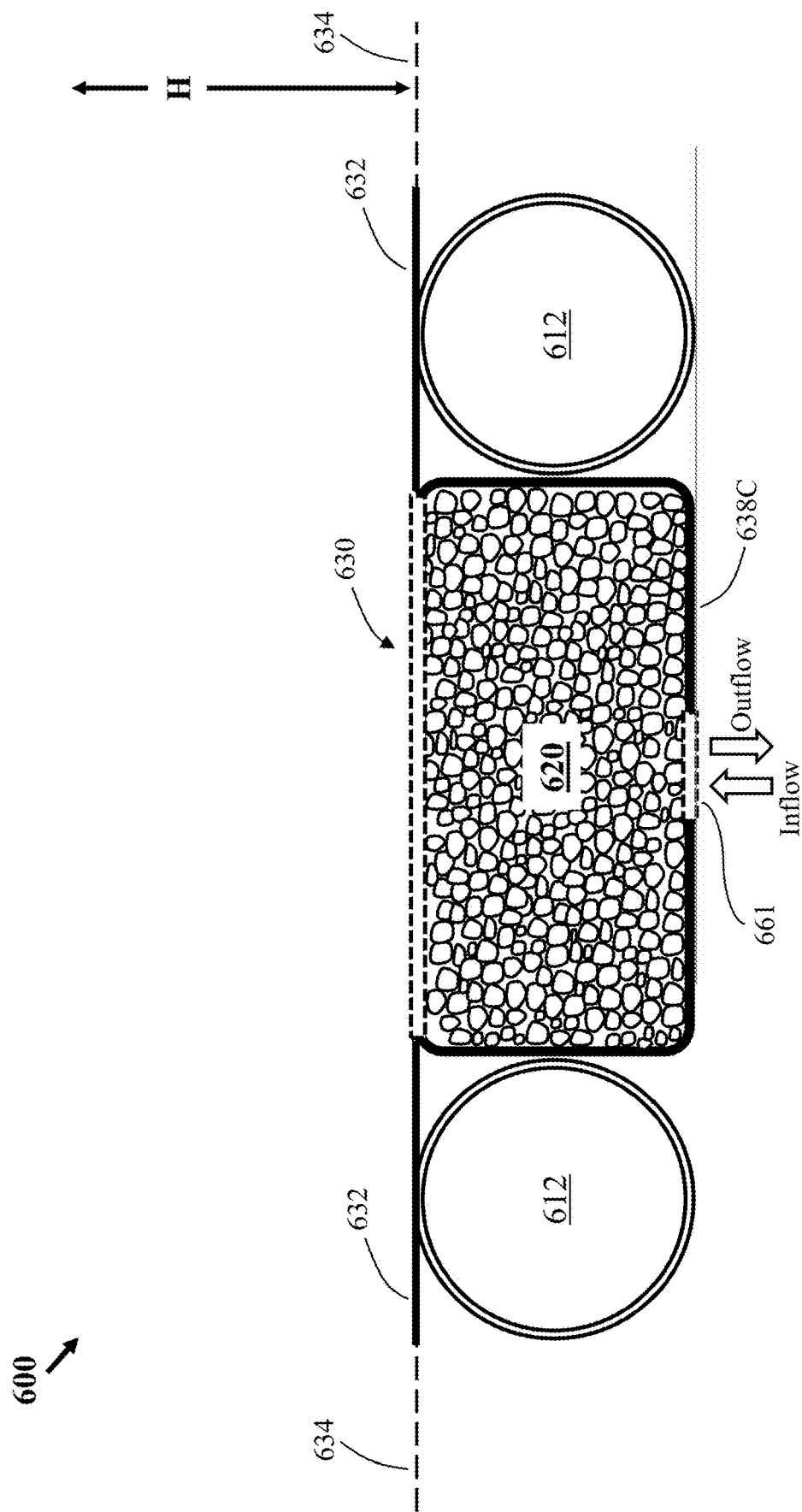
FIG. 6C illustrates a side cross section view of the fully loaded passive floating platform of FIG. 6A floating at about sea level.

FIG. 6C shows a side cross section view of the floating platform 600 with the opening 630 loaded with solid magnesium hydroxide and any seawater contacting said solid magnesium hydroxide, when the platform 600 floats with the upper surface 632 at about the sea level 634, and the bottom surface of the opening 630 being at the bottom level 638c which is deeper than the bottom level 638b of FIG. 6B with regard to the sea level 634.

The solid magnesium hydroxide 620 is then bathed in seawater by passively allowing the opening 630 to partially or completely flood with seawater delivered by ocean waves having a height of H, for example by getting seawater into the floating platform 600 via ocean waves topping over the side of the floating platform 600.

As the magnesium hydroxide 620 gets diluted in the seawater, consumes dissolved $CO_2$ and converts it to bicarbonate and carbonate ions as described above in the Equation (1), the mass of the magnesium hydroxide 620 in the opening 630 gradually decreases, while the volume of the seawater partially filling in the opening 630 proportionately increases. Because the specific mass of the seawater is smaller than that of magnesium hydroxide, this results in the floating platform 630 gradually rising above the sea level 634 as the magnesium hydroxide 620 gets diluted.

Figure 6D:
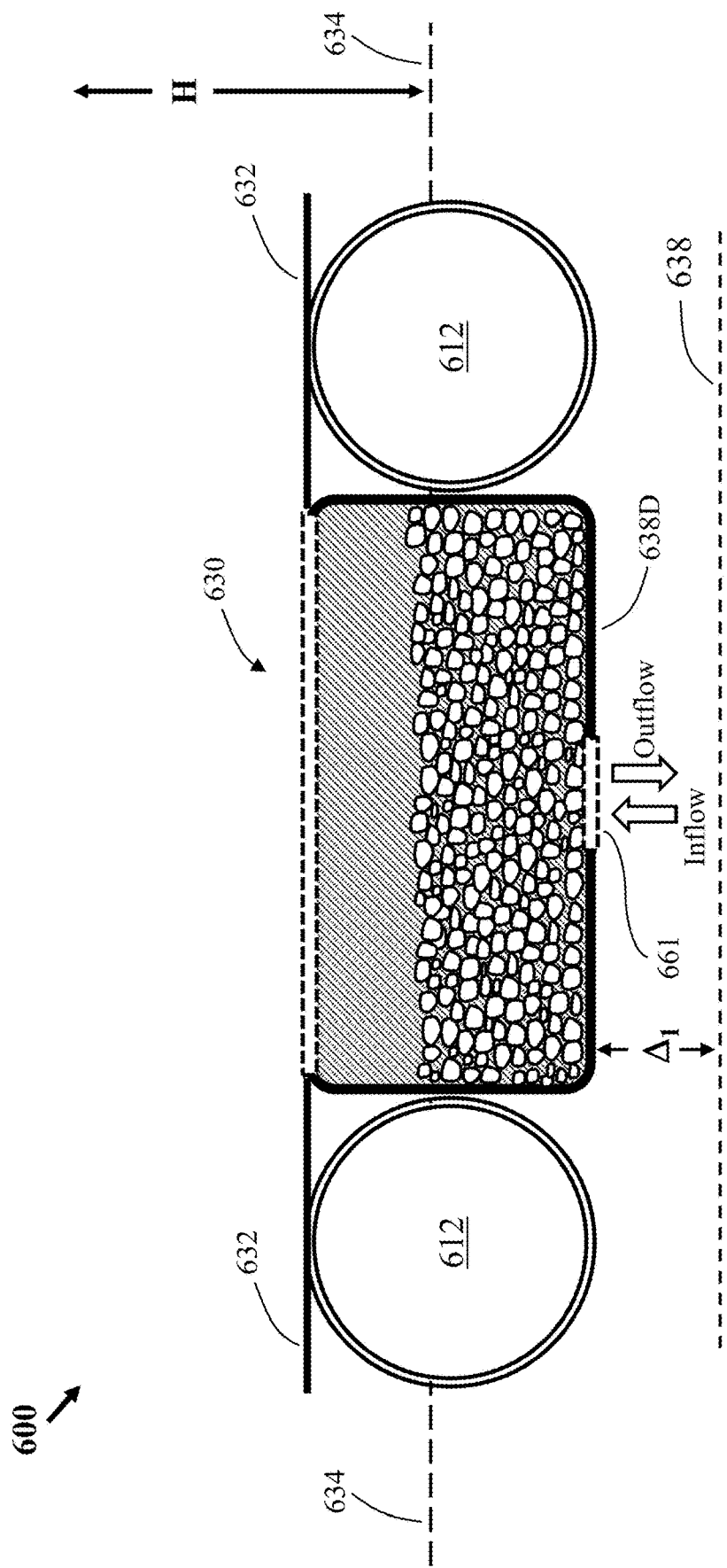
FIG. 6D illustrates a side cross section view of the partially loaded passive floating platform of FIG. 6A.
Figure 6E:
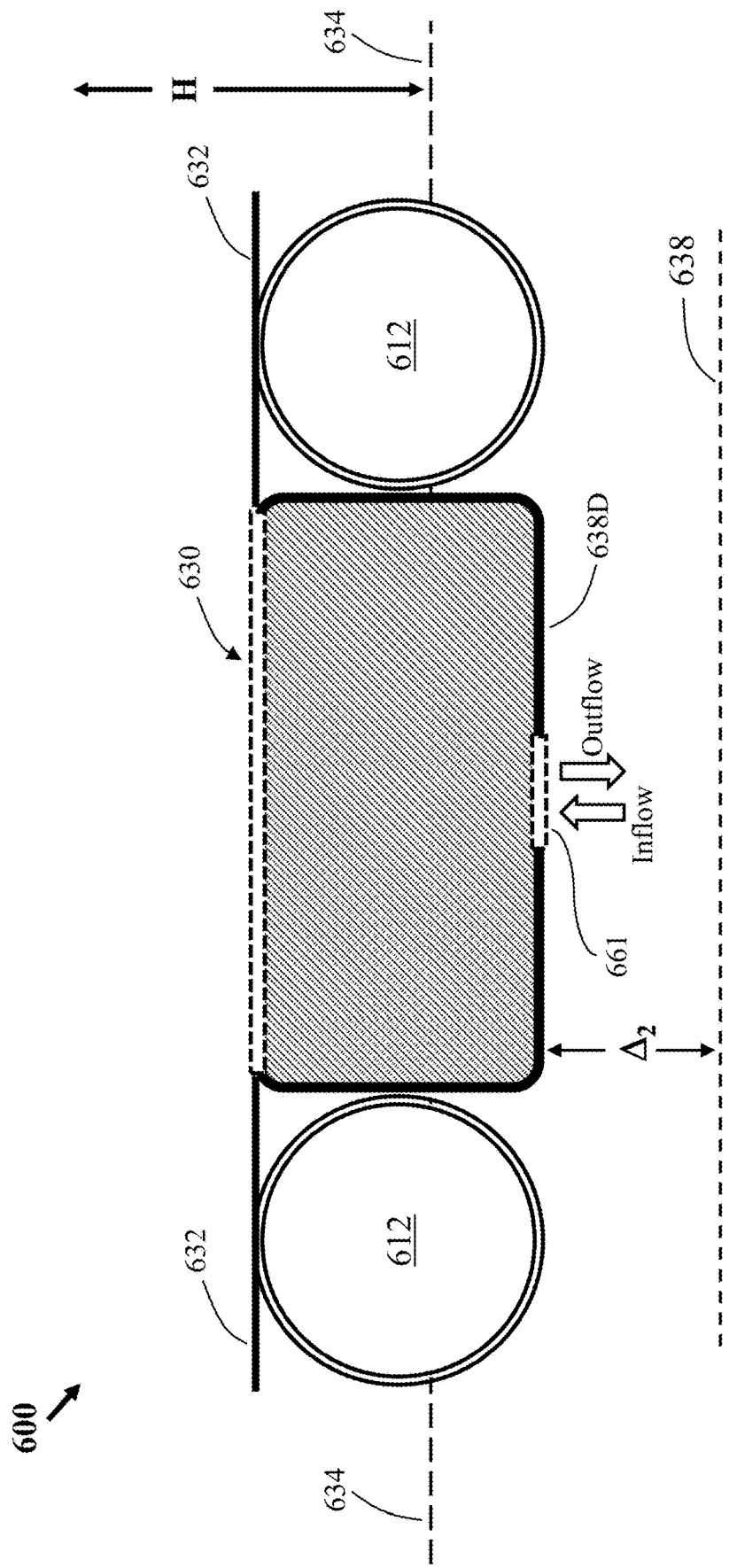
FIG. 6E illustrates a side cross section view of the passive floating platform of FIG. 6A with all magnesium hydroxide in the hull being dissolved.

This is illustrated in FIG. 6D and FIG. 6E.

In more detail, FIG. 6D illustrates the opening 630 partially filled in with the solid magnesium hydroxide 620 and partially filled in with seawater 621, with the bottom surface 638d of the floating platform 600 being at the bottom level 638d, which is higher than the bottom level 638 of FIG. 6B by about $\Delta_1$ distance.

Similarly, FIG. 6E illustrates the opening 630 completely filled in with seawater 621 when all solid magnesium hydroxide is diluted, with the bottom surface 638e of the floating platform 600 being at the bottom level 638e, is higher than the bottom level 638 of FIG. 6B by about $\Delta_2$ distance, and $\Delta_2$ is greater than $\Delta_1$.

In the embodiment illustrated by FIGS. 6A, 6B, 6C, 6D and 6E, the discharge of the alkalized water out of the opening 630 into the ocean is performed by just sloshing out the alkalized water of the top side of the opening 630 of the floating platform 600, or additionally or alternatively, by forming the side opening 650 on the side of the floating platform 600, or forming the bottom opening 661 or in the bottom of the hull 630, as mentioned above.

In order to ensure that all remaining solid magnesium hydroxide in the opening 630 is exposed and diluted in the seawater delivered by ocean waves, it is required to provision that when the floating platform 610 gradually rises (see FIG. 6D) and magnesium hydroxide gets dilutes up to the point when the opening 630 gets completely filled in with seawater with no solid magnesium hydroxide available (see FIG. 6E), the upper surface 632 of the opening 630 in FIG. 6E is still equal or below the height H of the ocean waves in the part of the ocean where the floating platform 610 is placed.

A wireless weight sensor 660 may be placed on the floating platform 600 or nearby to measure and report on the amount of $Mg(OH)_2$ remaining, and another sensor or sensors 670 measuring the characteristics of the surrounding seawater including pH $pCO_2$ and conductivity.

If pH or other parameter near the platform reaches a predetermined upper threshold, for example pH of about 9.4-10, the sensor 670 sends a signal to raise the platform so as to reduce the submerge surface being contacted by the seawater and thus the generation of the dissolved $Mg(OH)_2$. The platform may be raised (or lowered) for example by pneumatic means 691, 692, wherein air is pumped into (or released from) the buoyancy devices (612), thus affecting platform height and the volume of seawater contacting the solid $Mg(OH)_2$ surfaces.

The opening or hull 630 may also have a permeable side opening 650 or bottom opening 661 having a membrane, diaphragm or semi permeable barrier, the permeable section 650 positioned at least partially below the waterline of the floating platform 600 in order to allow the inflow and/or outflow of seawater to effect $Mg(OH)_2$ dissolution and discharge rate, when there are no waves of sufficient magnitude in the ocean, or in addition to in addition to the dissolution of $Mg(OH)_2$ in the hull 630 by ocean waves delivering the seawater at the top of the hull 630.

Preferably, the permeability of the membrane, diaphragm, semi permeable barrier or cloth is chosen to allow the passage of $Mg^{2+}$ and OH ions into the surrounding seawater at a rate not to exceeding about 3 mmoles/(L×m²×day). Full saturation of the seawater with metal hydroxide is not required since at least some $CO_2$ reaction with dissolved metal hydroxide will occur at any concentration above ambient seawater levels.

The permeability of the barrier is chosen to maximize flow rate of seawater across the membrane, driven by wave action, tidal forces, ocean currents or mechanical means, while limiting the escape of solid particles.

The choice of membrane is therefore chosen as the largest pore size that is still smaller than the smallest hydroxide particle size. Due to this restriction, it is advantageous to supply the floating platform 600 with metal hydroxide solids that are significantly larger than the pore size of the membrane. For example, supplying the floating platform with natural brucite aggregate whose mean diameter per individual aggregate is 10 cm can be retained by a semi-permeable barrier with a mean pore size of 10 microns so as to retain all but the smallest particles produced via dissolution and fragmentation of the aggregate while allowing sufficient water in and out of the platform.

In operation of the floating platform 600, the seawater thus contacting the $Mg(OH)_2$ mass in the hull 630 is allowed to become partially or completely saturated with dissolved $Mg(OH)_2$. The $Mg(OH)_2$-enriched seawater is then continuously released into the ocean.

Figure 7A:
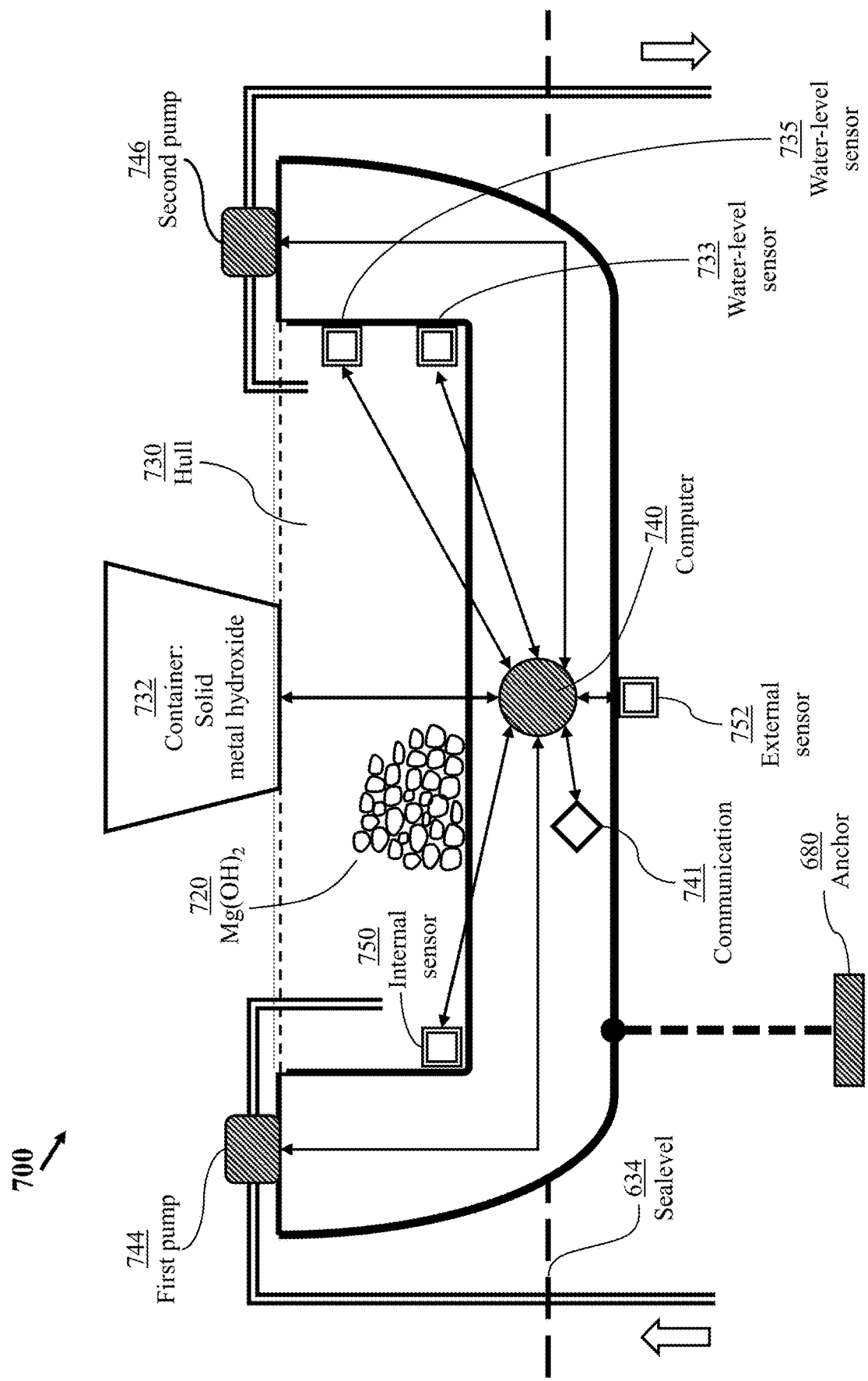
FIG. 7A illustrates another embodiment of the floating platform with pumping the seawater into the hull and pumping the magnesium hydroxide solution out of the hull into the ocean.

FIG. 7A schematically illustrates a floating platform 700 of another embodiment of the invention for distribution of dissolved magnesium hydroxide in the ocean.

The floating platform 700 of FIG. 7A has a hull or opening 730, which may be either similar to the opening of 630 of FIG. 6A, or alternatively, the hull 730 may have a form of a closed cavity, with no exposure to ocean waves. FIG. 7A shows the hull 730 in the form of the closed cavity.

Figure 7B:
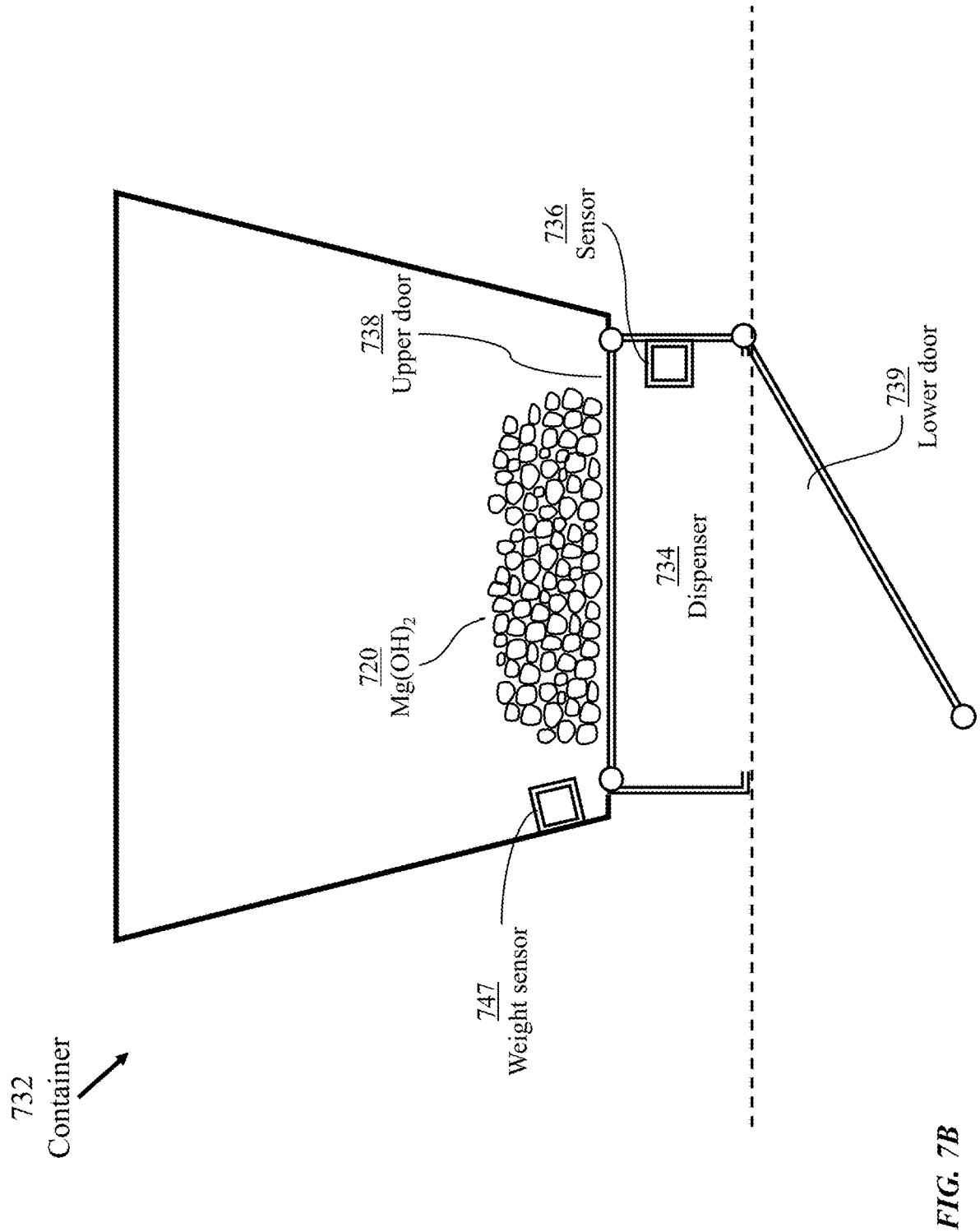
FIG. 7B illustrates the container 732 of FIG. 7A in more detail.

The floating platform 700 has a container 732 which is illustrated in more detail in FIG. 7B. The container 732 has solid magnesium hydroxide stored in an upper portion 720 of the container 732, and a dispenser 734 in the lower portion of the container 732 for dispensing a predetermined or required amount of magnesium hydroxide from the container 732 in the hull 730, the required amount being calculated by the computer 740. The dispenser 734 is operable in response to a dispensing signal, which is triggered by a sensor 736 associated with the dispenser 734. Upon receiving the dispensing signal, and assuming the dispenser 734 is already loaded with the predetermined amount of magnesium hydroxide with an upper door 738 of the dispenser 734 being closed, a lower door 739 of the dispenser is opened, and the predetermined amount of magnesium hydroxide is released in the hull 730. Next, the lower door 739 of the dispenser 734 is closed, the upper door 738 is opened, allowing loading the next predetermined amount of magnesium hydroxide in the dispenser 734, and the upper door 738 is closed again, thus preparing the dispenser 734 for the next operation.

In a simple form, the dispensing sensor 736 may be implemented, for example, as a timer, which triggers the control signal upon elapsing a certain predetermined period of time since the previous operation of the dispenser 734, for example 12 hours or one day. Alternatively, the control signal may be generated by a computer 740 having a processor and a memory, controlling the entire operation of the floating platform 700.

The container 732 has a weight sensor 747 for measuring and reporting on the amount of $Mg(OH)_2$ remaining in the upper portion 720 of the container to the computer 740. The floating platform 700 also has a communication sensor 741 controlled by the computer 740 for sending a communication signal to outside entities, for example a request to a ship or a ground control station within an operational range of the communication sensor 741, for loading magnesium hydroxide in the container 732 or relocating the floating platform 700 to another location in the ocean.

The floating platform 700 also has a first pump 744 for pumping seawater from the ocean into the hull 730 for diluting the magnesium hydroxide, and a second pump 746 for pumping the solution of the magnesium hydroxide dissolved in the seawater out of the hull 730 to the ocean. Both the first pump 744 and the second pump 746 are controlled by the processor 740.

Further, the floating platform 700 has an internal sensor 750, for example a pH sensor, for measuring pH of the solution in the hull 730, and an external sensor 752 for measuring characteristics of the seawater surrounding the floating platform 700, for example, pH and/or inorganic carbon of the surrounding seawater in the vicinity of the floating platform 700, for example within 100-300 meters. Assuming pH of the solution, prepared in the hull 730, is already within required environmental limits, for example in the range of about 9.0-9.4, then pH sensor 752 may become optional.

Additionally, the floating platform has a sensor 733 for measuring a lower water level inside the hull 730 and another sensor 735 for measuring an upper water level inside the hull 730 to make sure the water level in the hull 730 is within a predetermined range.

The floating platform 700 of FIG. 7A also has an anchor 680 similar to that of FIG. 6A for anchoring the floating platform 700 in a required area in the ocean. The hull 730 may optionally have a side opening (not shown) similar to the opening 650 of FIG. 6A, or a bottom opening (not shown) similar to the bottom opening 661 of FIG. 6A, to be used when the first and second pumps 744 and 746 are not working, and the platform 700 is actually converted into a passive floating platform 600 of FIG. 6A.

The floating platform 700 has two modes of operation.

Figure 8A:
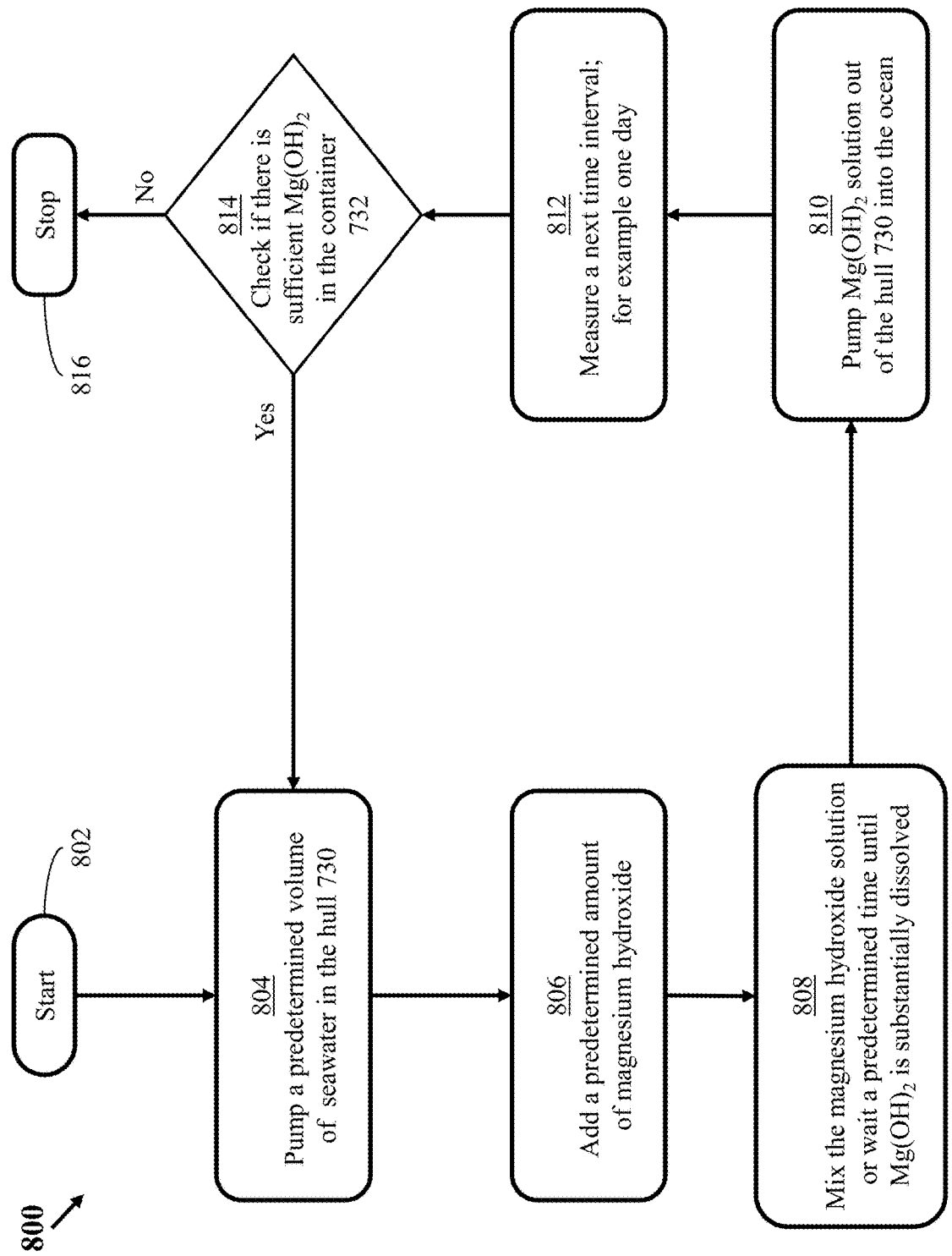
FIG. 8A illustrates an intermittent mode of operation of the floating platform of FIG. 7A.

FIG. 8A shows a flow-chart 800 illustrating a first, intermittent mode of operation of the floating platform 700. Upon start (box 802), a predetermined volume of seawater is pumped into the hull 730 using the first pump 744 (box 804). Then a predetermined amount of magnesium hydroxide is added to the seawater in hull 730 (box 806), followed by mixing the solution or waiting a predetermined period of time until substantially all magnesium hydroxide is diluted in the hull 730 (box 808) to reach a pH of the solution within a predetermined pH range, for example <9.

As soon as magnesium hydroxide is substantially dissolved, activating the second pump 746 and pumping the solution with magnesium hydroxide out of the hull 730 into the seawater surrounding the floating platform (box 810). Wait for a predetermined time interval, for example one day, (box 812), and check if there is sufficient amount of magnesium hydroxide in the container 732 (box 814). If yes (exit Yes from box 814), repeat the steps 804-812 all over again. If no (exit NO from box 814), terminate the operation of the floating platform 700 until a new load of solid magnesium hydroxide is loaded in the container 732.

Please note that sensors 750, 752, 733 and 735 may be optional for the intermittent mode of operation of the floating platform 700, and thus, the floating platform 700 may be somewhat simplified.

In a modification of the above embodiment of FIG. 7A, the first pump 744 and the second pump 746 may be replaced with a single bidirectional pump controlled by the computer 740 and capable of performing both operations: pumping the seawater into the hull 730 and pumping the alkaline solution out of the hull 730 into the ocean, either simultaneously in both directions or intermittently in each direction.

Figure 8B:
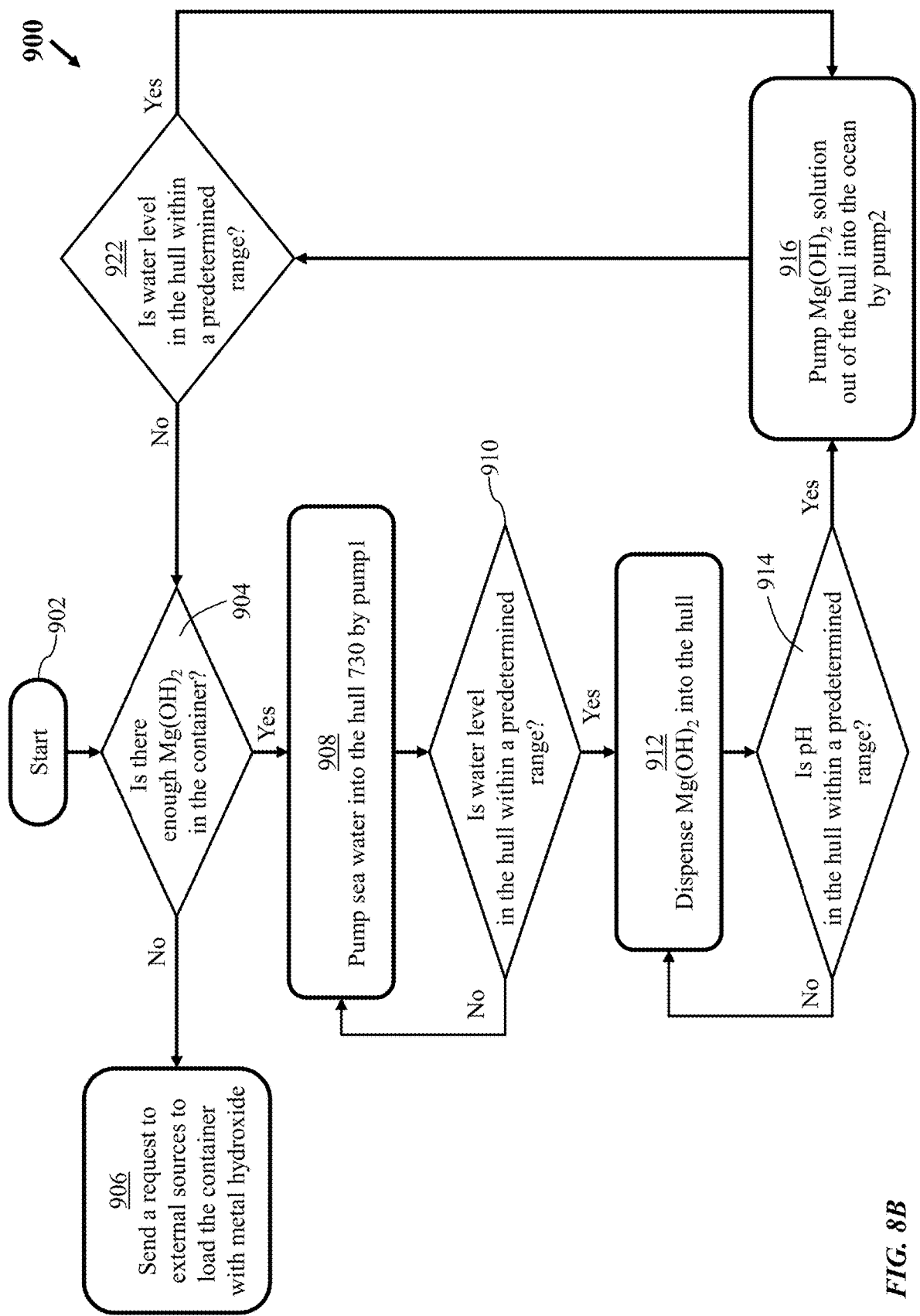
FIG. 8B illustrates a continuous mode of operation of the floating platform of FIG. 7A.

FIG. 8B shows a flow-chart 900 illustrating a second, continuous mode of operation of the floating platform 700.

Upon Start (box 902) the procedure 900 checks if there is sufficient amount of magnesium hydroxide in the container 732 of the floating platform 700 (box 904). If no (exit No from box 904), the procedure sends a request to external sources to load the container 732 with a new load of magnesium hydroxide and waits (box 906), periodically checking if the container 732 has been loaded (loop from the box 906 to box 902 and box 904). If yes (exit Yes from box 904), the computer 740 instructs the first pump 744 to pump seawater into the hull 730 (box 908), followed by checking if the water level in the hull 730 is within a predetermined range (box 910). If no (exit No from box 910), the procedure returns back to the step 908. If yes (exit Yes from box 910), the computer instructs the dispenser 734 to dispense magnesium hydroxide into the hull 730 (box 912), followed by checking if a pH level in the seawater in the hull 730 is within a predetermined pH range (box 914) not to exceed a permitted environmental pH threshold, for example pH from about 9.0 to about 9.4. If no (exit No from box 914), the procedure returns back to box 912. If yes (exit yes from box 914), the computer instructs the second pump 746 to pump the $Mg(OH)_2$ solution out of the hull 730 into the ocean (box 916), followed further checking if the water level in the hull 730 is within a predetermined range (box 922). If yes (exit Yes from box 922), the procedure returns back to box 916. If no (exit No from box 922), the procedure returns back to box 904.

Thus, the embodiments of FIGS. 8A and 8B allow the $Mg(OH)_2$-enriched seawater to be periodically or continuously released into the ocean.

As mentioned above, the surface area of the solid $Mg(OH)_2$ relative to the flushing rate of the seawater in contact with the solid $Mg(OH)_2$ are controlled such that a dissolution rate of not more than 3 mmoles/(L×m²×day) (0.175 g $Mg(OH)_2$/(L×m²×day) is maintained. For example, if 10,000 L of water is allowed in and out of the floating platform per day to contact the solid $Mg(OH)_2$, this limits the maximum total discharge of dissolved $Mg(OH)_2$ to 1,750 g/day that in turn limits the maximum size of the solid $Mg(OH)_2$ surface area exposed to the contacting seawater to 10,000 m².

Such surface area can be provided by a cube of 41 meters per side or a sphere with a maximum diameter of 56.4 meters. Since solid $Mg(OH)_2$ objects this size may be difficult to manufacture and handle, it follows that a multitude of much smaller objects that together maximally present the 10,000 m² required may be desirable. For example 10,000 cubes each presenting 1 m² (0.41 m on a side) or 100,000 spheres each presenting 0.1 m² (0.178 m in diameter). The shapes of the solid objects may be irregular as long as 10,000 m² of solid $Mg(OH)_2$ surface area is presented. The solid forms may be manufactured from synthetic $Mg(OH)_2$ or from natural $Mg(OH)_2$ (brucite mineral), or may be used in the forms and sizes naturally resulting from the $Mg(OH)_2$ synthesis or mineral extraction process without further shaping or sizing. Furthermore, the daily amount of water contacting the mass or masses can be varied to accommodate specific mass surface areas presented.

It is understood that as such solid masses dissolve their mass and surface area decreases and hence the production rate of dissolved $Mg(OH)_2$ to seawater declines. This can be countered by periodically adding additional $Mg(OH)_2$ mass (surface area) to the floating platform 600 or 700 as described above. The volume/day of contacting seawater can also be adjusted to maintain a specific $Mg(OH)_2$ concentration in the water discharged to the ocean.

Powdered $Mg(OH)_2$ will dissolve and saturate in seawater yielding a pH of 9.4 within 1 hour. In order to maintain a maximum pH of 9 in the bulk of the surrounding seawater, a constant flow of seawater through the hull 410 is required. This flow rate is set based on the surface area of the $Mg(OH)_2$ exposed to the seawater in order to achieve a maximum residence time of about 1 hour. Saturated seawater is then discharged into an area with a corresponding refresh rate to maintain a maximum pH of 9 due to dilution effects. This discharge is achieved through natural wave, tidal or current action or through pumping, as described above.

Once released, dilution of the added metal hydroxide to seawater can quickly reduce undesirable chemical conditions as distance and time from release increase. For example, depending on ocean conditions, dilution by a factor of 100 can occur in the ocean 10 minutes after discharge. If that discharge has a pH of 9, in 10 minutes the mixing of 1 part discharge water with 100 parts ambient seawater with a pH of 8 would result a mixed seawater pH of 8.004. Thus, the interplay between discharge release rate and dilution with seawater determines the areal extent and duration of undesirable seawater chemistry if present.

The preceding methods then control the rate at which dissolved $Mg(OH)_2$ is produced and released into the surrounding seawater, the degree and rate of seawater dissolved $Mg(OH)_2$ dilution, and thus the magnitude of pH increase and associated chemical changes at any given place and time in the surrounding seawater.

The floating platform 600 may be placed and anchored at sea, as schematically illustrated by the anchor 680 in FIG. 6A or FIG. 7A. The anchoring 680 could be either provided by a direct connection to the seafloor or through anchoring systems that allow a certain amount of drift. Once set in place, seawater, through the action of wind or currents, flows through the permeable material and over and through channels in the $Mg(OH)_2$. This erodes the hydroxide, raising the pH of the surrounding seawater.

Conveniently, the floating platform 600 may be anchored, for example in an area of high flow such as a tidal area, an estuary or other river mouth to more rapidly weather and dilute the hydroxide.

Alternatively, the floating platform can be allowed to passively drift on the ocean surface thus adding dissolved $Mg(OH)_2$ along a path dictated by surface ocean currents and winds. Furthermore, the platform can be outfitted with facilities for autonomous navigation and propulsion so as to allow the platform to stay in one spot or to traverse a prescribed route on the ocean surface, for example to eventually return to a station that would provide resupply of solid $Mg(OH)_2$ and allow maintenance of the platform.

Figure 9:
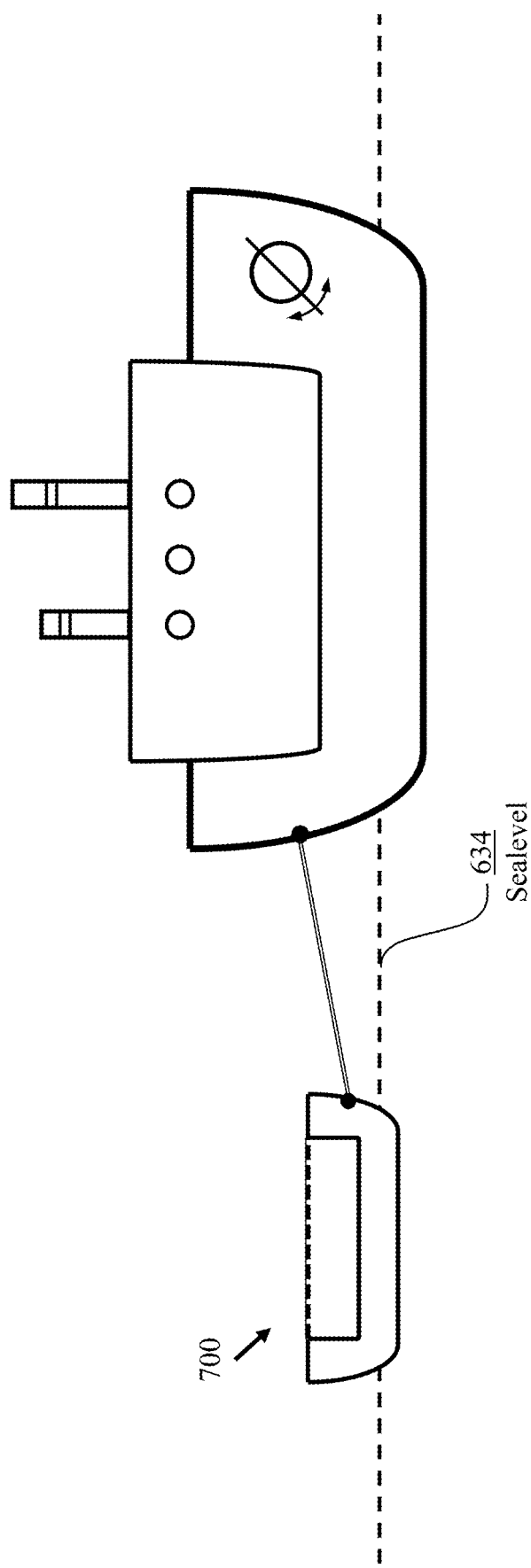
FIG. 9 schematically illustrates the floating platform of FIG. 6A pulled by a ship.

Also, the floating platform 600 or 700 may be pulled behind the ship, as shown in FIG. 9.

Figure 10:
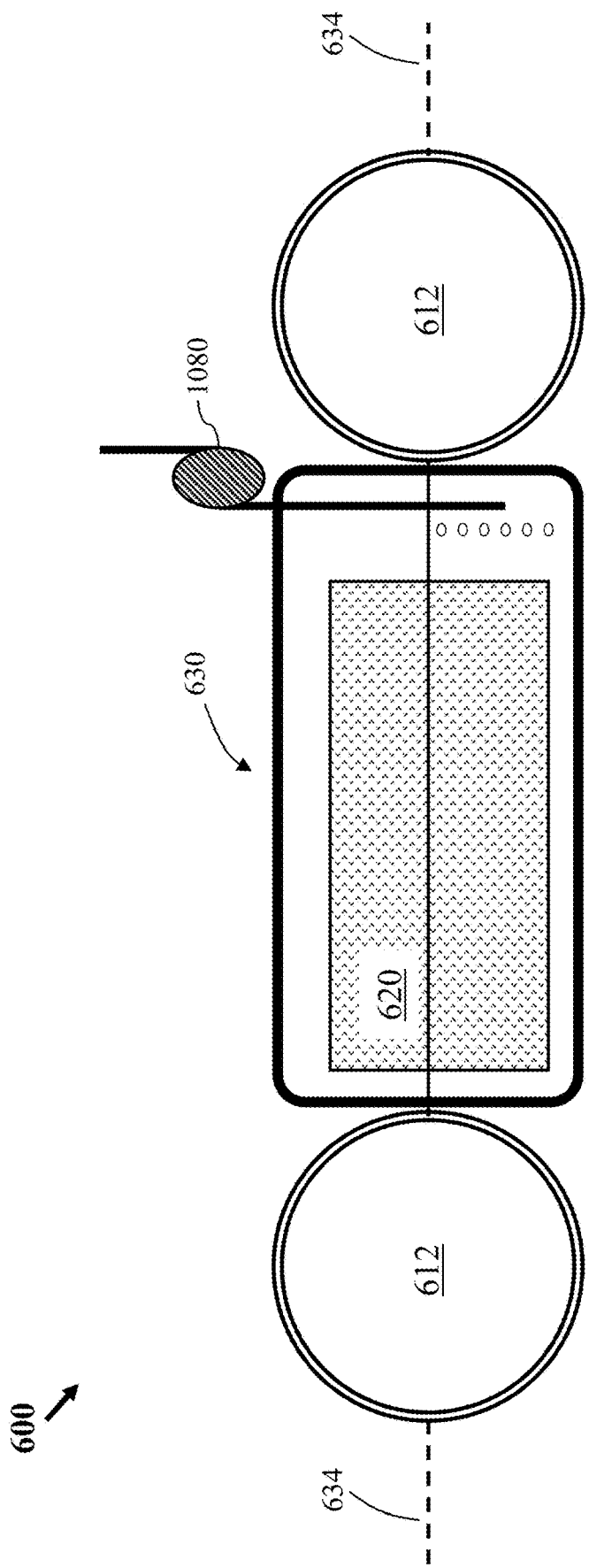
FIG. 10 illustrates the aeration of seawater within the floating platform that is aerated to facilitate atmospheric $CO_2$ removal and sequestration and to facilitate lowering of pH prior to discharge in the ocean.

In yet another embodiment, illustrated in FIG. 10, the floating platform 600 is fitted with a device such as an air pump 1080 that facilitates the contacting of air with the seawater within the hull 630 that contains dissolved $Mg(OH)_2$. By bubbling air through the seawater enriched with dissolved $Mg(OH)_2$ the transfer of $CO_2$ from air into the seawater is accelerated, thus speeding up $CO_2$ removal and sequestration from air, raising seawater DIC, and beneficially lowering the seawater's pH from otherwise more elevated values.

Figure 11:
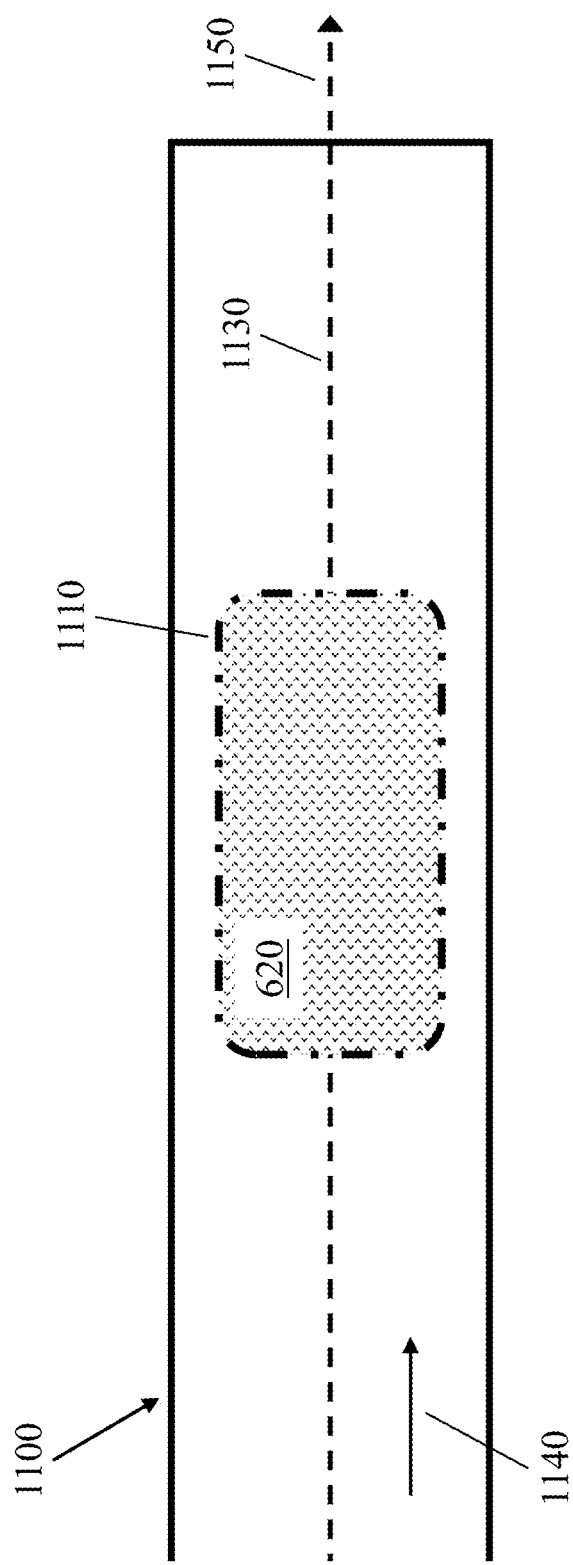
FIG. 11 illustrates a side view of another embodiment showing the placement in a water flow of a mass of $Mg(OH)_2$ solids encased in a semi-permeable container so as to facilitate $Mg(OH)_2$ dissolution and production of dissolved $Mg(OH)_2$ prior to the water flowing into the ocean.

In another embodiment illustrates in FIG. 11, the platform 1100 containing the $Mg(OH)_2$ does not float, but is secured at the ocean's shoreline or within water discharging into the ocean such as a river, stream, wastewater discharge or other natural or artificial discharge of water to the ocean. Thus, the flow of water provided by ocean waves, currents or water flowing 1140 through and around a mass of solid $Mg(OH)_2$ 620 encased in a porous container 1110 and is at least partially submerged below the water level 1130 causes the dissolution of $Mg(OH)_2$ into water that ultimately discharges 1150 into the ocean. The $Mg(OH)_2$ may be contained in porous vessels or containers that allow the contacting of water with the solid $Mg(OH)_2$ to effect $Mg(OH)_2$ dissolution and the production of dissolved $Mg(OH)_2$ that immediately or eventually enters the ocean. Such containers or vessel include but are not limited to: burlap bags, screened metal containers, or troughs containing synthetic or natural $Mg(OH)_2$ solids around or through which seawater or water (ultimately discharging to the ocean) passes.

The geographic scale of the present invention and its global capacity to remove and sequester atmospheric $CO_2$ may be increased through the deployment of multiple platforms 600, 700 or 1100.

By coloring the above-ocean surfaces of the floating platforms white or a light color, the floating platforms could service to reduce surface ocean albedo. This would provide a means of reducing the amount of solar energy reaching the ocean and thus beneficially reduce surface ocean warming that is otherwise occurring as a consequence of elevated anthropogenic $CO_2$ in the atmosphere.

In yet one more embodiment, the floating platform 600 or 700 is deployed to an area of ocean upwelling where surface seawater is supersaturated in $CO_2$ relative to the overlying atmosphere and where the addition of dissolved magnesium hydroxide beneficially captures and sequesters dissolved $CO_2$ that would otherwise escape to the atmosphere.

While the use of $Mg(OH)_2$ is discussed in the above embodiments, it is understood that other metal hydroxides or other sparingly or fully soluble alkaline materials may be similarly be used in the invention. Here, the specific rates of alkaline material dissolution in seawater are again used to design platforms that allow the release of dissolved metal hydroxide to the surface ocean such that seawater pH does not exceed 9 and/or outward chemical and biological effects are avoided. Such alkaline materials include but are not limited to: $Ca(OH)_2$, $NaOH$, $KOH$, $MgO$, $CaO$, $CaSiO_4$ and $Mg_2SiO_4$.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A floating platform for sequestering carbon dioxide using a body of water in contact with the atmosphere, comprising:
   a hull for holding solid metal hydroxide;
   means for exposing the solid metal hydroxide to an inflow of water to create a solution of a metal hydroxide not exceeding a predetermined pH level;
   means for releasing the solution containing the metal hydroxide into the body of water, causing a reaction of released metal hydroxide with carbon dioxide present in the body of water, thereby converting at least some of the carbon dioxide to one or more of a metal carbonate and metal bicarbonate, thereby sequestering the carbon dioxide using a body of water and respectively reducing the amount of the carbon dioxide in the atmosphere; and
   means for regulating an outflow of the released metal hydroxide and means for regulating said inflow of water so as to maintain the solution containing the metal hydroxide at or below the predetermined pH level.

2. The floating platform of claim 1, wherein the metal hydroxide is magnesium hydroxide.

3. The floating platform of claim 2, wherein the inflow and the outflow are regulated to produce and dispense about 3 mmoles of dissolved $Mg(OH)_2$ per L of solution per $m^2$ of $Mg(OH)_2$ surface area per day.

4. The floating platform of claim 2, wherein the means for releasing the solution containing the magnesium hydroxide is configured to release the solution at such rate that seawater alkalinity (AT) concentration in the water surrounding the floating platform does not exceed about 4 mmoles/L.

5. The floating platform of claim 1, wherein the predetermined pH level is from about 9.0 to about 9.4.

6. The floating platform of claim 1, wherein the predetermined pH level is not exceeding about 9.4.

7. The floating platform of claim 1 further comprising an air pump for facilitating air contact with contents of the hull to accelerate transfer of carbon dioxide from air into the solution that is ultimately discharged into the body of water.

8. The floating platform of claim 1 further comprising:
a sensor for measuring a remaining amount of the metal hydroxide within the hull;
at least one sensor for measuring specific characteristics of water surrounding the floating platform; and
a mechanism for regulating height of the floating platform with respect to the surface of the body of water according to the remaining amount of the metal hydroxide and the specific characteristics of the surrounding water.

9. The floating platform of claim 8 further comprising buoyant compartments supporting the floating platform, the mechanism comprising pneumatic equipment for pumping air to, or releasing air from, the buoyant compartment, for regulating elevation of the floating platform with respect to the surface of the body of water in order to adjust inflow rate and outflow rates of water into and out of the hull.

10. The floating platform of claim 1 further comprising buoyant compartments supporting the floating platform, wherein:
a size of the hull;
a mass of said solid metal hydroxide loaded in the hull; and
the buoyant compartments;
are selected so that an upper surface of the hull is above a water surface of the body of water but lower than an average height of water waves around the floating platform.

11. The floating platform of claim 10, further comprising at least one opening at the top of the floating platform to allow water from the water waves to overtop and enter the hull, and another opening for discharging the solution into the body of water.

12. The floating platform of claim 1 wherein the means for releasing comprises a porous membrane, diaphragm or semi permeable barrier, for allowing metal hydroxide ions and metal hydroxide particles of size smaller than a preselected size to discharge to the body of water.

13. The floating platform of claim 12 wherein porosity and granular size of the mass of solid metal hydroxide are chosen so as to maximize inflow rate of water, from the body of water, while limiting escape of the solid metal hydroxide.

14. The floating platform of claim 1 wherein the means for regulating the inflow and the means for regulating the outflow are based on empirical data relating pH level in the solution to lapsed time and measurements of constituent water and metal hydroxide.

15. A floating platform for sequestering carbon dioxide using a body of water in contact with the atmosphere, comprising:
a hull coupled to a dispenser configured to dispense metal hydroxide from a container to the hull;
a first processor-controllable pump for effecting inflow of water from the body of water to the hull to create a solution of metal hydroxide having a pH level;
a second processor-controllable pump for effecting outflow of the solution of metal hydroxide into the body of water, causing a reaction of outflowed metal hydroxide with carbon dioxide present in the body of water, and converting at least some of the carbon dioxide to one or more of a metal carbonate and metal bicarbonate, hence sequestering the carbon dioxide using the body of water and respectively reducing the amount of the carbon dioxide in the atmosphere;
and
a control system comprising:
a dispensing sensor; and
a processor communicatively coupled to the dispensing sensor, the first pump, and the second pump, and configured to regulate dispensing the metal hydroxide, the inflow, and the outflow so as to maintain the solution at or below a predetermined pH level.

16. The floating platform of claim 15 wherein the control system further comprises an additional set of sensors, communicatively coupled to the processor, comprising:
a communication sensor for sending communication signals from the processor to outside entities;
and
a sensor within the container communicatively configured to measure a remaining amount of metal hydroxide and report result to said processor.

17. The floating platform of claim 16 wherein, provided said remaining amount of metal hydroxide is sufficient, causing the processor to:
send a first control signal instructing the first pump to pump a predetermined volume of water from the body of water to the hull;
send a dispensing signal instructing the dispenser to transfer a predetermined amount of metal hydroxide from the container to the hull;
send a second control signal, after a predetermined time interval, instructing the second pump to pump the solution into the body of water; and
determine a waiting time interval prior to subsequent recurrence.

18. The floating platform of claim 17 wherein the processor is configured to select the predetermined volume of water, predetermined amount of metal hydroxide, the predetermined time interval, and the waiting time, based on empirical data relating pH level in said solution to lapsed time and measurements of constituent water and metal hydroxide.

19. The floating platform of claim 15 wherein the control system further comprises an additional set of sensors, communicatively coupled to the processor, comprising:
a communication sensor for sending communication signals from the processor to outside entities;
a sensor for measuring a remaining amount of metal hydroxide;
a first inner sensor for measuring characteristics of the solution in the hull; and
a second inner sensor for measuring a water level in the hull.

20. The floating platform of claim 19 wherein, provided said remaining amount of metal hydroxide is sufficient, causing the processor recurrently to:
while water level in the hull is within a predetermined range of water levels, instruct the first pump to pump water from the body of water to the hull;
while pH level in the hull is within a predetermined range of PH levels, send a dispensing signal instructing the dispenser to transfer metal hydroxide from the container to the hull;

and
while water level in the hull is within said the predetermined range of water levels, instructs the second pump to pump the solution from the hull into the body of water.

21. The floating platform of claim 15 wherein the control system further comprises an outer sensor, coupled to the processor, for measuring characteristics of water surrounding the floating platform.

22. The floating platform of claim 15 wherein the hull has at least one of a side opening and a bottom opening for enabling the inflow of water and outflow of the solution of metal hydroxide passively, without using the first pump and the second pump.

* * * * *